(12) United States Patent
Plumb et al.

(10) Patent No.: US 7,957,575 B2
(45) Date of Patent: Jun. 7, 2011

(54) COUNTING BIOLOGICAL AGENTS ON BIOLOGICAL GROWTH PLATES

(75) Inventors: Michael R. Plumb, White Bear Lake, MN (US); Christine A. Binsfeld, Woodbury, MN (US); Doyle T. Potter, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/795,921

(22) Filed: Jun. 8, 2010

(65) Prior Publication Data

US 2010/0266192 A1    Oct. 21, 2010

Related U.S. Application Data

(62) Division of application No. 11/854,786, filed on Sep. 13, 2007, now Pat. No. 7,738,689, which is a division of application No. 10/656,089, filed on Sep. 5, 2003, now Pat. No. 7,298,886.

(51) Int. Cl.
  *G06K 9/00* (2006.01)
  *G06K 9/34* (2006.01)
  *G06K 9/66* (2006.01)
  *H01R 33/00* (2006.01)
(52) U.S. Cl. ............ 382/133; 382/173; 382/194; 435/39
(58) Field of Classification Search .......... 382/128–132, 382/203, 209, 217, 254, 266; 600/407, 427; 128/898, 920, 922–923; 345/629–634, 641
See application file for complete search history.

(56) References Cited

U.S. PATENT DOCUMENTS

| | | | |
|---|---|---|---|
| 3,493,772 A | | 2/1970 | Daughters, II et al. |
| 3,811,036 A | * | 5/1974 | Perry .............................. 377/10 |
| 3,962,040 A | | 6/1976 | Campbell et al. |
| 4,118,280 A | | 10/1978 | Charles et al. |
| 4,146,775 A | | 3/1979 | Kirchner et al. .............. 219/295 |
| 4,160,601 A | | 7/1979 | Jacobs |

(Continued)

FOREIGN PATENT DOCUMENTS

DE      19819144       4/1998

(Continued)

OTHER PUBLICATIONS

Gilchrist et al, "Spiral Plate Method for Bacterial Determination", Applied Microbiology, Feb. 1973, p. 244-252, vol. 25, No. 2.*

(Continued)

*Primary Examiner* — Vu Le
*Assistant Examiner* — Andrae S Allison
(74) *Attorney, Agent, or Firm* — Michael G. Williams

(57) ABSTRACT

The invention is directed to counting techniques for counting biological agents on a biological growth plate or similar medium. In order to automate the counting of biological agents, a biological growth plate is inserted into a biological scanning unit. Upon insertion of the biological growth plate, the biological scanning unit generates an image of the plate. Then, the amount of biological agents that appear in the image, such as a number of bacteria colonies, can be counted or otherwise determined using image processing and analysis routines performed either by the scanning unit or an external computing device, such as a desktop computer, workstation or the like. A variety of counting rules are described herein that can be used to improve the accuracy of automated counts of biological agents on a biological growth plate.

3 Claims, 17 Drawing Sheets

U.S. PATENT DOCUMENTS

| | | | | |
|---|---|---|---|---|
| 4,353,988 | A | * | 10/1982 | Couse et al. ............... 435/287.1 |
| 4,563,096 | A | | 1/1986 | Chidlow et al. ............... 356/440 |
| 4,591,567 | A | | 5/1986 | Britten et al. |
| 4,637,053 | A | * | 1/1987 | Schalkowsky ............... 382/133 |
| 4,720,463 | A | | 1/1988 | Farber et al. |
| 4,724,215 | A | | 2/1988 | Farber et al. |
| 4,817,785 | A | | 4/1989 | Farber et al. |
| 4,856,073 | A | | 8/1989 | Farber et al. |
| 5,099,521 | A | * | 3/1992 | Kosaka ............... 382/133 |
| 5,117,467 | A | * | 5/1992 | Misaki et al. ............... 382/133 |
| 5,202,010 | A | | 4/1993 | Guzman ............... 204/299 |
| 5,270,173 | A | | 12/1993 | Yonemori et al. ............... 435/29 |
| 5,290,701 | A | | 3/1994 | Wilkins |
| 5,329,686 | A | | 7/1994 | Kildal et al. |
| 5,364,766 | A | | 11/1994 | Mach et al. |
| 5,366,873 | A | | 11/1994 | Eden et al. |
| 5,372,485 | A | | 12/1994 | Sumser et al. |
| 5,372,936 | A | | 12/1994 | Fraatz et al. |
| 5,375,043 | A | | 12/1994 | Tokunaga |
| 5,403,722 | A | | 4/1995 | Floeder et al. |
| 5,428,690 | A | | 6/1995 | Bacus et al. |
| 5,448,652 | A | | 9/1995 | Vaidyanathan et al. |
| 5,510,246 | A | | 4/1996 | Morgan |
| 5,539,517 | A | | 7/1996 | Cabib et al. |
| 5,573,950 | A | | 11/1996 | Graessle et al. |
| 5,591,974 | A | | 1/1997 | Troyer et al. ............... 250/336 |
| 5,671,290 | A | * | 9/1997 | Vaidyanathan ............... 382/133 |
| 5,694,478 | A | * | 12/1997 | Braier et al. ............... 382/133 |
| 5,721,435 | A | | 2/1998 | Troll |
| 5,723,308 | A | | 3/1998 | Mach et al. |
| 5,744,322 | A | | 4/1998 | Krejcarek et al. |
| 5,747,333 | A | | 5/1998 | Jungmann-Campello et al. |
| 5,781,311 | A | | 7/1998 | Inoue et al. |
| 5,787,189 | A | | 7/1998 | Lee et al. |
| 5,817,475 | A | | 10/1998 | Gibbs et al. |
| 5,995,645 | A | | 11/1999 | Soenksen et al. |
| 6,002,789 | A | * | 12/1999 | Olsztyn et al. ............... 382/133 |
| 6,058,209 | A | | 5/2000 | Vaidyanathan et al. ....... 382/203 |
| 6,096,272 | A | | 8/2000 | Clark et al. |
| 6,107,054 | A | | 8/2000 | Gibbs |
| 6,134,354 | A | * | 10/2000 | Lee et al. ............... 382/270 |
| 6,238,879 | B1 | | 5/2001 | Gibbs |
| 6,243,486 | B1 | * | 6/2001 | Weiss ............... 382/133 |
| 6,271,022 | B1 | | 8/2001 | Bochner |
| 6,319,668 | B1 | | 11/2001 | Nova et al. ............... 435/6 |
| 6,372,485 | B1 | | 4/2002 | Clark et al. |
| 6,381,353 | B1 | * | 4/2002 | Weiss ............... 382/133 |
| 6,418,180 | B1 | | 7/2002 | Weiss |
| 6,459,994 | B1 | | 10/2002 | Parekh et al. ............... 702/19 |
| 6,485,979 | B1 | | 11/2002 | Kippenhan et al. |
| 6,488,890 | B1 | | 12/2002 | Kirckof |
| 6,642,953 | B1 | | 11/2003 | Nieto Velasco et al. |
| 6,673,315 | B2 | | 1/2004 | Sheridan et al. |
| 6,690,470 | B1 | | 2/2004 | Baer et al. |
| 6,711,283 | B1 | | 3/2004 | Soenksen |
| 6,716,588 | B2 | | 4/2004 | Sammak et al. |
| 6,737,266 | B1 | | 5/2004 | Wicks et al. ............... 435/288 |
| 6,999,607 | B2 | | 2/2006 | Kiros et al. ............... 382/128 |
| 7,057,721 | B2 | | 6/2006 | Gardiner, Jr. et al. ....... 356/301 |
| 7,298,885 | B2 | | 11/2007 | Green et al. ............... 382/133 |
| 7,496,225 | B2 | | 2/2009 | Graessle et al. ............... 382/133 |
| 2001/0031502 | A1 | | 10/2001 | Watson, Jr. et al. |
| 2001/0041347 | A1 | | 11/2001 | Sammak et al. |
| 2002/0025082 | A1 | | 2/2002 | Kaushikkar et al. ......... 382/294 |
| 2002/0064867 | A1 | | 5/2002 | Clark et al. |
| 2002/0137091 | A1 | | 9/2002 | Luttermann et al. |
| 2002/0167161 | A1 | | 11/2002 | Butland ............... 283/72 |
| 2002/0191825 | A1 | | 12/2002 | Parekh et al. ............... 382/128 |
| 2004/0071342 | A1 | * | 4/2004 | Locht et al. ............... 382/164 |
| 2004/0101189 | A1 | | 5/2004 | Green et al. |
| 2004/0101951 | A1 | | 5/2004 | Vent et al. |
| 2004/0101952 | A1 | | 5/2004 | Vent |
| 2004/0101954 | A1 | | 5/2004 | Graessle et al. |
| 2004/0102903 | A1 | | 5/2004 | Graessle et al. |
| 2005/0053265 | A1 | | 3/2005 | Graessle et al. ............... 382/128 |
| 2005/0053266 | A1 | | 3/2005 | Plumb et al. ............... 382/128 |
| 2005/0095665 | A1 | | 5/2005 | Williams et al. ............... 435/34 |
| 2005/0222778 | A1 | | 10/2005 | Levinson et al. ............... 702/19 |
| 2006/0263258 | A1 | | 11/2006 | Harris et al. ............... 422/99 |
| 2008/0003562 | A1 | | 1/2008 | Plumb et al. ............... 435/3 |

FOREIGN PATENT DOCUMENTS

| | | |
|---|---|---|
| EP | 0 008 826 A2 | 3/1980 |
| EP | 0 088 601 A1 | 9/1983 |
| EP | 0 301 600 | 2/1989 |
| EP | 0 397 256 A2 | 11/1990 |
| EP | 0 429 030 A3 | 5/1991 |
| EP | 0 193 385 B1 | 4/1992 |
| EP | 0 547 709 A3 | 6/1993 |
| EP | 0 819 930 A2 | 1/1998 |
| EP | 1 074 610 | 2/2001 |
| GB | 2 249 829 A | 5/1992 |
| JP | 60-83597 | 5/1985 |
| JP | 62-215383 | 9/1987 |
| JP | 5-249105 | 9/1993 |
| JP | 6-98220 | 4/1994 |
| JP | 6-109545 | 4/1994 |
| JP | 7-275200 | 10/1995 |
| JP | 10-24283 | 1/1998 |
| JP | 2001-242082 | 7/2001 |
| JP | 2002-538440 | 11/2002 |
| WO | WO 92/12233 | 7/1992 |
| WO | WO 94/01528 | 1/1994 |
| WO | WO 94/26926 | 1/1994 |
| WO | WO 95/16768 | 6/1995 |
| WO | WO 96/18721 | 6/1996 |
| WO | WO 98/53301 | 11/1998 |
| WO | WO 98/59314 | 12/1998 |
| WO | WO 99/28436 | 6/1999 |
| WO | WO 00/32807 | 6/2000 |
| WO | WO 00/49129 | 8/2000 |
| WO | WO 00/49130 | 8/2000 |
| WO | WO 00/51058 | 8/2000 |
| WO | WO 00/65094 | 11/2000 |
| WO | WO 01/09371 | 2/2001 |
| WO | WO 01/83673 | 11/2001 |
| WO | WO 02/90966 | 2/2002 |
| WO | WO02/37938 | 5/2002 |
| WO | WO02/46354 | 6/2002 |
| WO | WO 03/014400 | 2/2003 |
| WO | WO 03/038413 | 5/2003 |

OTHER PUBLICATIONS

Product brochure entitled "Powerful Data Handling for GLP Conformance," by ProtoCOL, Synbiosis, a division of Synoptic Ltd, Cambridge, UK (4 pgs.).

Product brochure entitled "Efficient Batch Handling" by ProtoZONE, Synbiosis, a division of Synoptic LTD., Cambridge, UK (4 pgs.).

Product brochure entitled "Petrifilm™ Information Management System—Reduce Operational Costs and Increase Productivity". 3M Microbiology Products; 1999, 70-2009-1996-0; (3 pgs.).

Ilya et al., "Streamlined Yeast Colorimetric Reporter Activity Assays Using Scanners and Plate Readers", BioTechniques—Short Technical Reports, Aug. 2000, vol. 29, No. 2, pp. 278-288.

K. M. Wright et al., "Determination of Mean Growth Parameters of Bacterial Colonies Immobilized in Gelatin Gel Using a Laser Gel-Cassette Scanner", International Journal of Food Microbiology, 2000, pp. 75-89.

Gilchrist et al.; "Spiral Plate Method for Bacterial Determination", Applied Microbiology, Feb. 1973, pp. 244-252, vol. 25, No. 2.

Corkidi et al, "Covasiam: An Image Analysis Method That Allows Detection of Confluent Microbial Colonies and Colonie of Various Sizes for Automated Counting", pp. 1400-1404, Apr. 1998.

Decision on Appeal dated Dec. 2, 2008 in U.S. Appl. No. 10/306,663, filed Nov. 23, 2002 (18 pgs.).

Kalasinsky, Kathryn S. et al.; "Raman Chemical Imaging Spectroscopy Reagentless Detection and Identification of Pathogens: Signature Development and Evaluation"; Analytical Chemistry; 2007; 79 (7) pp. 2658-2673.

* cited by examiner

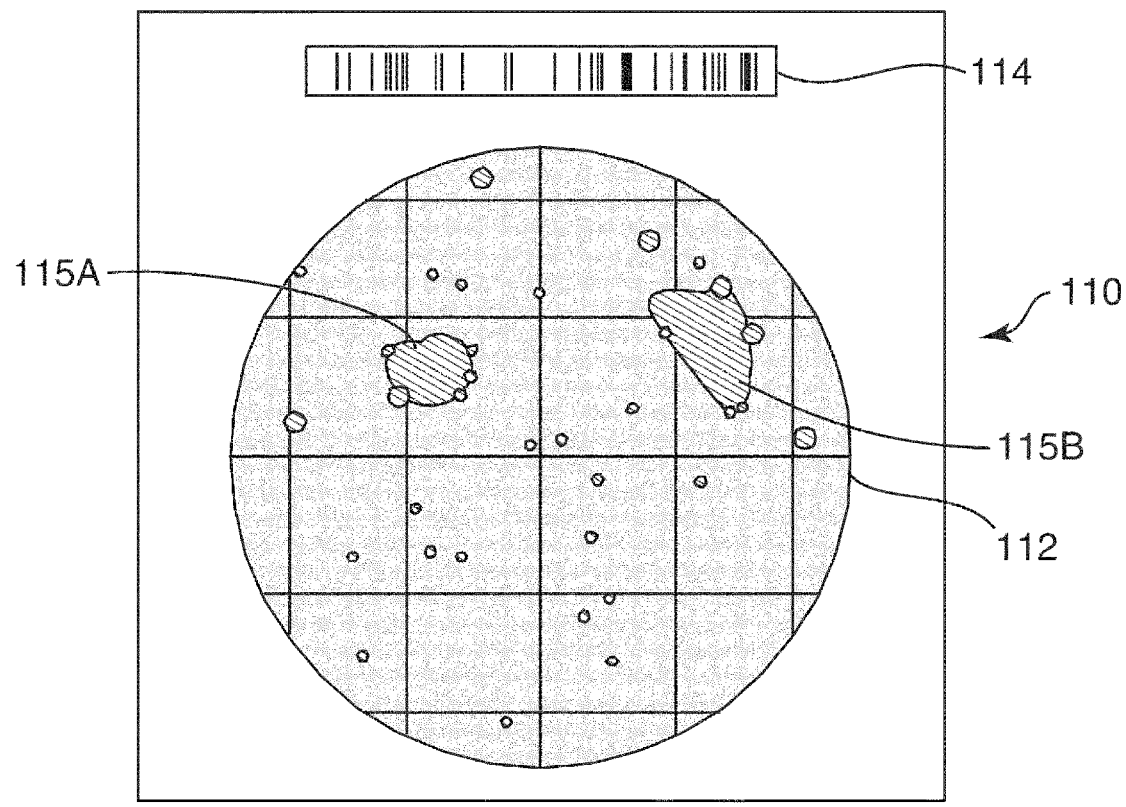
LEGEND FOR FIG. 11
 Colony
*Fig. 11*
 Spreader colony
 Spreader colony LEGEND FOR FIG. 16
▨ Red Colony
◉ Red Colony with Gas
▨ Blue Colony
◉ Blue Colony with Gas

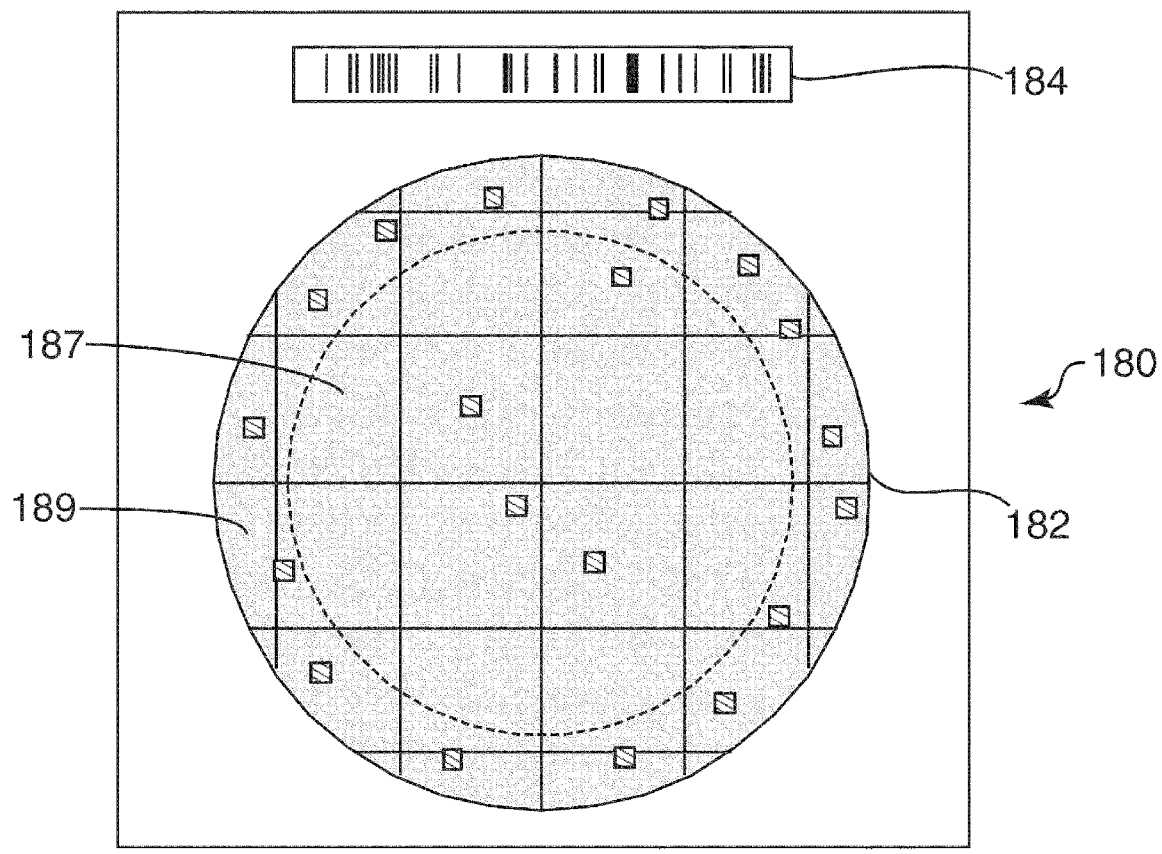
*Fig. 18*
LEGEND FOR FIG. 18
 Colony

US 7,957,575 B2

COUNTING BIOLOGICAL AGENTS ON BIOLOGICAL GROWTH PLATES

CROSS REFERENCE TO RELATED APPLICATION

This application is a divisional of U.S. Ser. No. 11/854,786, filed Sep. 13, 2007, now U.S. Pat. No. 7,738,689 which is a divisional of U.S. Ser. No. 10/656,089, filed Sep. 5, 2003, now U.S. Pat. No. 7,298,886, the disclosures of which are incorporated by reference in their entirety herein.

FIELD

The invention relates to biological scaning systems for analysis of biological growth plates and detection of bacteria or other biological agents in food samples, laboratory samples, and the like.

BACKGROUND

Biological safety is a paramount concern in modern society. Testing for biological contamination in foods or other materials has become an important and often mandatory requirement for developers and distributors of food products. Biological testing is also used to identify bacteria or other agents in laboratory samples such as blood samples taken from medical patients, laboratory samples developed for experimental purposes, and other types of biological samples. Various techniques and devices can be utilized to improve biological testing and to streamline and standardize the biological testing process.

A wide variety of biological growth plates have been developed. As one example, biological growth plates have been developed by 3M Company (hereafter "3M") of St. Paul, Minn. In particular, biological growth plates are sold by 3M under the trade name PETRIFILM plates. Biological growth plates can be utilized to facilitate the rapid growth and detection of bacteria or other biological agents commonly associated with food contamination, including, for example, aerobic bacteria, *E. coli*, coliform, enterobacteriaceae, yeast, mold, *Staphylococcus aureus, Listeria, Campylobacter*, and the like. The use of PETRIFILM plates, or other growth media, can simplify bacterial testing of food samples.

Biological growth plates can be used to enumerate or identify the presence of bacteria so that corrective measures can be performed (in the case of food testing) or proper diagnosis can be made (in the case of medical use). In other applications, biological growth plates may be used to rapidly grow bacteria or other biological agents in laboratory samples, e.g., for experimental purposes.

Biological scanning units refer to devices used to scan or count bacterial colonies, or the amount of a particular biological agent on a biological growth plate, or the like. For example, a food sample or laboratory sample can be placed on a biological growth plate, and then the plate can be inserted into an incubation chamber. After incubation, the biological growth plate can be placed into the biological scanning unit for automated detection and enumeration of bacterial growth. In this manner, biological scanning units automate the detection and enumeration of bacteria or other biological agents on a biological growth plate, and thereby improve the biological testing process by reducing human error.

SUMMARY

In general, the invention is directed to techniques for counting biological agents on a biological growth plate or similar medium. To count biological agents, a biological growth plate is inserted into a biological scanning unit. Upon insertion of the biological growth plate, the biological scanning unit generates an image of the plate. Then, the amount of biological agents that appear in the image, such as a number of bacteria colonies, can be counted or otherwise determined using image processing and analysis routines performed either within the biological scanning unit or by an external computing device, such as a desktop computer, workstation or the like. In accordance with the invention, a variety of counting rules are described that can be used to improve the accuracy of automated counts of biological agents on a biological growth plate.

In one embodiment, the invention provides a method comprising receiving one or more images of a biological growth medium, determining whether a background color value associated with the biological growth medium is within a range, and flagging the biological growth medium for additional review if the background color value is outside the range.

In another embodiment, the invention provides a method comprising receiving one or more images of a biological growth medium, identifying a first count of biological agents on the biological growth medium, and reducing the first count to generate a second count when one or more biological agents identified in the first count are determined to be in close proximity to one or more other biological agents identified in the first count.

In another embodiment, the invention provides a method comprising receiving one or more images of a biological growth medium, identifying a first number of biological agents associated with an interior portion of the biological growth medium, identifying a second number of biological agents associated with a perimeter portion of the biological growth medium, and excluding from the second number one or more biological agents within a defined distance from an edge of a growth area of the growth medium when the first number is less than a threshold.

In another embodiment, the invention provides a method comprising receiving one or more images of a biological growth medium, identifying a number of first color biological agents associated with an interior portion of the biological growth medium, identifying a number of second color biological agents associated with the interior portion of the biological growth medium, identifying a number of first color biological agents associated with a perimeter portion of the biological growth medium, and identifying a number of second color biological agents associated with the perimeter portion of the biological growth medium. The method also includes changing the a number of second color biological agents associated with the perimeter portion to be included in the number of first color biological agents associated with the perimeter portion when the number of first color biological agents associated with the interior portion is greater than a first threshold and the number of second color biological agents associated with the interior portion is less than a second threshold.

In another embodiment, the invention provides a method comprising receiving one or more images of a biological growth medium, identifying a first number of biological agents associated with an interior portion of the biological growth medium, identifying a second number biological agents associated with a perimeter portion of the biological growth medium, and flagging the biological growth medium for additional review if the second number is greater than a factor multiplied by the first number.

In another embodiment, the invention provides computer readable medium comprising computer readable instructions that when executed in a processor receive one or more images of a biological growth medium, determine whether a background color value associated with the biological growth medium is within a range, and flag the biological growth medium for additional review if the background color value is outside the range.

In another embodiment, the invention provides a computer readable medium comprising computer readable instructions that when executed in a processor receive one or more images of a biological growth medium, identify a first count of biological agents on the biological growth medium, and reduce the first count to generate a second count when one or more biological agents identified in the first count are determined to be in close proximity to one or more other biological agents identified in the first count.

In another embodiment, the invention provides a computer readable medium comprising computer readable instructions that when executed in a processor receive one or more images of a biological growth medium, identify a first number of biological agents associated with an interior portion of the biological growth medium, identify a second number of biological agents associated with a perimeter portion of the biological growth medium, and exclude from the second number one or more biological agents within a defined distance from an edge of a growth area of the growth medium when the first number is less than a threshold.

In another embodiment, the invention provides a computer readable medium comprising computer readable instructions that when executed in a processor receive one or more images of a biological growth medium, identify a number of first color biological agents associated with an interior portion of the biological growth medium, identify a number of second color biological agents associated with the interior portion of the biological growth medium, identify a number of first color biological agents associated with a perimeter portion of the biological growth medium, identify a number of second color biological agents associated with the perimeter portion of the biological growth medium, and change the a number of second color biological agents associated with the perimeter portion to be included in the number of first color biological agents associated with the perimeter portion when the number of first color biological agents associated with the interior portion is greater than a first threshold and the number of second color biological agents associated with the interior portion is less than a second threshold.

In another embodiment, the invention provides a computer readable medium comprising computer readable instructions that when executed in a processor receive one or more images of a biological growth medium, identify a first number of biological agents associated with an interior portion of the biological growth medium, identify a second number biological agents associated with a perimeter portion of the biological growth medium, and flag the biological growth medium for additional review if the second number is greater than a factor multiplied by the first number.

In another embodiment, the invention provides a system comprising an imaging device to generate one or more images of a biological growth medium, and a processor to receive the images, determine whether a background color value associated with the biological growth medium is within a range, and flag the biological growth medium for additional review if the background color value is outside the range.

In another embodiment, the invention provides a system comprising an imaging device to generate one or more images of a biological growth medium, and a processor to receive the images, identify a first count of biological agents on the biological growth medium, and reduce the first count to generate a second count when one or more biological agents identified in the first count are determined to be in close proximity to one or more other biological agents identified in the first count.

In another embodiment, the invention provides a system comprising an imaging device to generate one or more images of a biological growth medium, and a processor to receive the images, identify a first number of biological agents associated with an interior portion of the biological growth medium, identify a second number of biological agents associated with a perimeter portion of the biological growth medium, and exclude from the second number one or more biological agents within a defined distance from an edge of a growth area of the growth medium when the first number is less than a threshold.

In another embodiment, the invention provides a system comprising an imaging device to generate one or more images of a biological growth medium, and a processor to receive the images, identify a number of first color biological agents associated with an interior portion of the biological growth medium, identify a number of second color biological agents associated with the interior portion of the biological growth medium, identify a number of first color biological agents associated with a perimeter portion of the biological growth medium, identify a number of second color biological agents associated with the perimeter portion of the biological growth medium, and change the a number of second color biological agents associated with the perimeter portion to be included in the number of first color biological agents associated with the perimeter portion when the number of first color biological agents associated with the interior portion is greater than a first threshold and the number of second color biological agents associated with the interior portion is less than a second threshold.

In another embodiment, the invention provides system comprising an imaging device to generate one or more images of a biological growth medium, and a processor to receive the images, identify a first number of biological agents associated with an interior portion of the biological growth medium, identify a second number biological agents associated with a perimeter portion of the biological growth medium, and flag the biological growth medium for additional review if the second number is greater than a factor multiplied by the first number.

Various aspects of the invention may provide a number of advantages. For example, the invention may improve the accuracy of automated counts of biological agents on a biological growth plate. In particular, the rules described herein may address problems that commonly occur, and which can otherwise undermine the accuracy of automated counting of agents on a growth plate.

In addition, the invention may reduce costs of a biological system by allowing lower cost optical elements to be used in an imaging device. For example, one or more of the counting rules described herein may compensate for optical defects in an imaging device. Accordingly, in some cases counting rules can reduce the costs of a system biological scanning system by allowing lower cost optical elements to be used in the imaging device.

Additional details of these and other embodiments are set forth in the accompanying drawings and the description below. Other features, objects and advantages will become apparent from the description and drawings, and from the claims.

BRIEF DESCRIPTION OF DRAWINGS

FIG. 11 is a diagram of an exemplary growth medium illustrating one problem that can occur.

FIG. 18 is a diagram of an exemplary growth medium illustrating one problem that can occur.

DETAILED DESCRIPTION

The invention is directed to techniques for counting biological agents on a biological growth plate or similar medium. A variety of counting rules are described in greater detail below that can be used to improve the accuracy of automated counts of biological agents on a biological growth plate. The counting rules are typically stored as computer-executable software instructions, and are executed by a processor in a biological scanning system. Alternatively, the rules may be implemented in hardware such as an application specific integrated circuit (ASIC), a field programmable gate array (FPGA), or various hardware components. The various rules described herein may be applied individually, or in any combination depending on the growth medium being scanned. In any case, by applying one or more of the rules described herein, the accuracy of automated counts of biological agents on a biological growth plate can be improved.

Figure 1:
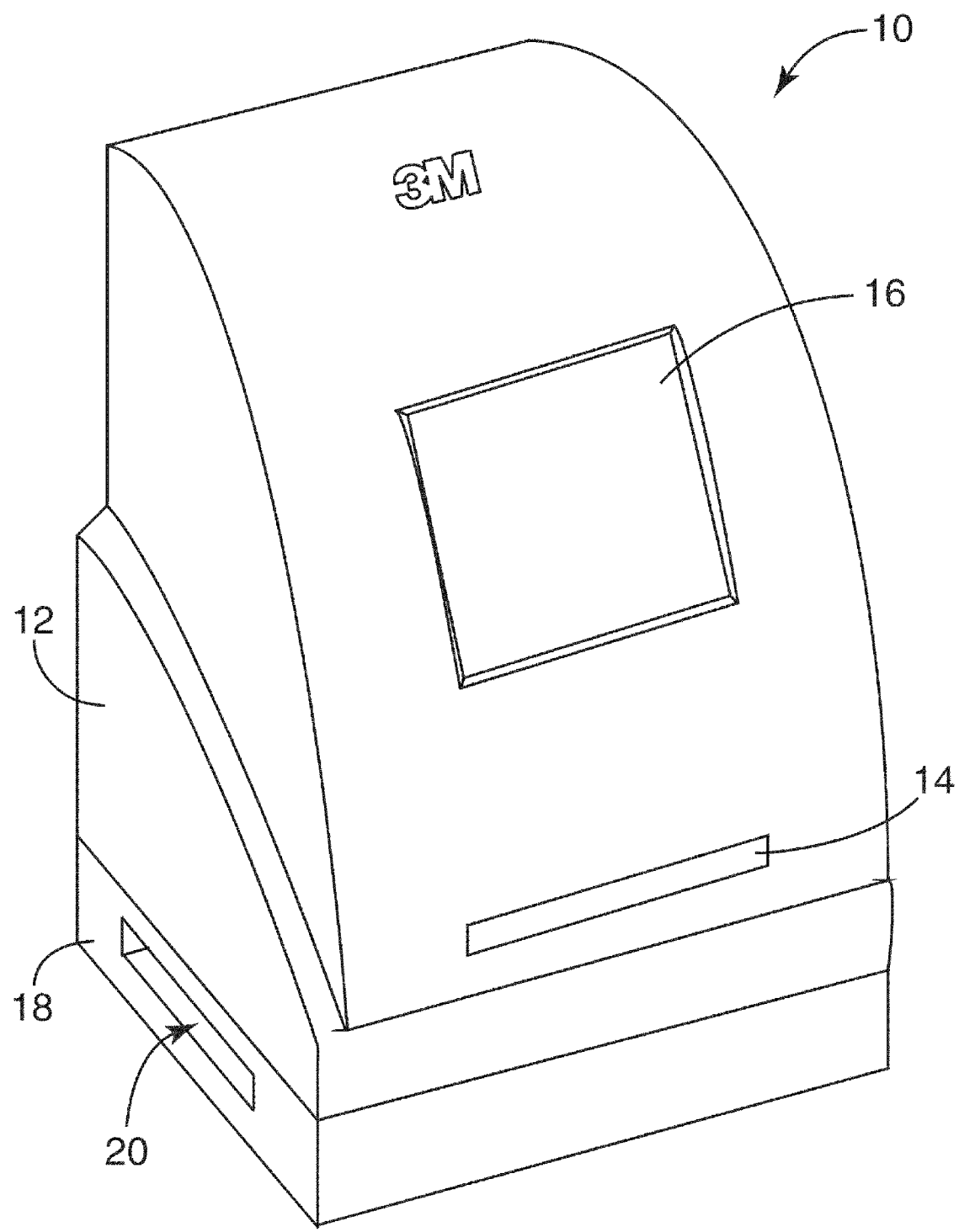
FIG. 1 is a perspective view of a biological scanning system that can execute counting techniques in accordance with the invention.

FIG. 1 is a perspective view of an exemplary biological scanning system 10 capable of implementing the counting rules described herein. As shown in FIG. 1, biological scanning system 10 includes a scanning unit 12 having a drawer 14 that opens to receive a biological growth plate (not shown in FIG. 1). Drawer 14 moves the biological growth plate into scanning unit 12 for scanning and analysis. An imaging device and a processor reside within scanning unit 12. When a biological growth plate is inserted into scanning unit 12 via drawer 14, the imaging device generates one or more images of the growth plate. The images are then sent to the processor, which counts the number of biological agents on the growth medium via image analysis. In particular, the processor within scanning unit 12 invokes one or more counting rules, as described in greater detail below, that can be used to improve the accuracy of automated counts of biological agents on a biological growth plate.

Biological scanning system 10 also may include a display screen 16 disposed on scanning unit 12 to display the progress or results of analysis of the biological growth plate to a user. Alternatively or additionally, display screen 16 may present to a user an image of the growth plate scanned by scanning system 10. The displayed image may be optically magnified or digitally scaled upward. A mounting platform 18 defines an ejection slot 20 through which the growth plate can be ejected following image capture by biological scanning system 10. In other words, biological scanning system 10 may have a two-part design in which scanning unit 12 is mounted on mounting platform 18. The two-part design is depicted in FIG. 1 for purposes of example, and is not intended to be required by or limiting of the inventions described herein.

Scanning unit 12 houses an imaging device for scanning the biological growth plate and generating an image. The imaging device may take the form of a line scanner or an area scanner, which ordinarily operates in combination with an illumination system to provide front and/or back illumination of the biological growth plate. In addition, scanning unit 12 may house processing hardware, software and/or firmware that performs analysis of the scanned image, e.g., in order to determine the number or amount of biological agents on the growth plate. For example, upon presentation of the biological growth plate via drawer 14, the plate may be positioned adjacent an optical platen for scanning Again, in accordance with the invention, various counting rules can be applied by a processor within scanning unit 12 in order to improve the accuracy of automated counts of biological agents on a biological growth plate.

When drawer 14 is opened following the scan of a growth plate, the growth plate may drop downward into the mounting platform 18 for ejection via ejection slot 20. To that end, mounting platform 18 may house a conveyor that ejects the growth plate from scanning unit 12 via ejection slot 20. In other words, after a biological growth plate is inserted into drawer 14, moved into scanning unit 12, and scanned, the biological growth plate drops downward into mounting platform 18, where a horizontal conveyor, such as a moving belt, ejects the medium via slot 20.

Figure 2:
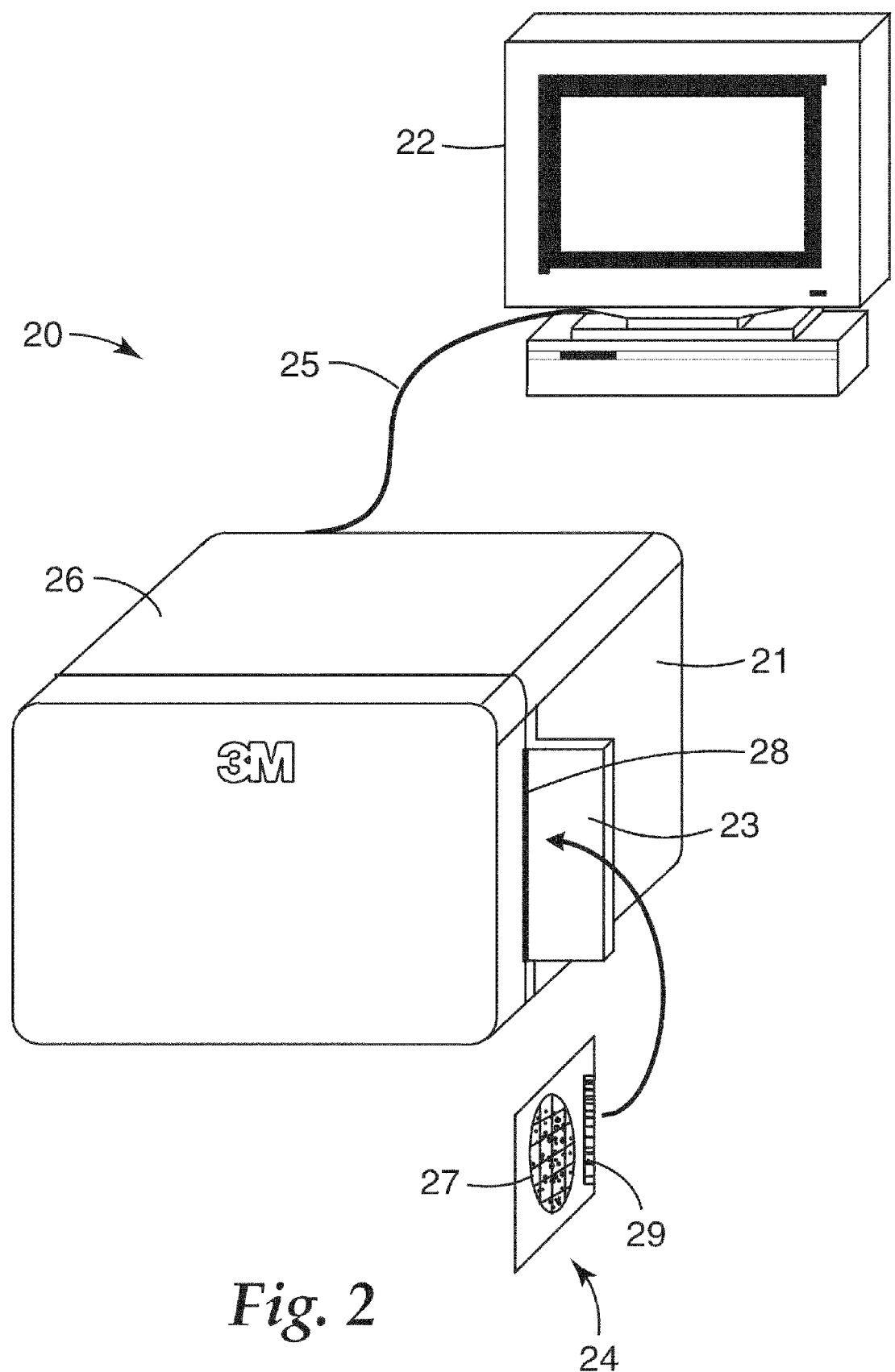
FIG. 2 is a perspective view of another exemplary biological scanning system comprising a scanning unit coupled to an external computer which performs imaging analysis as described herein.

FIG. 2 is a perspective view of another biological scanning system 20 capable of implementing the counting rules described herein. Biological scanning system 20 comprises a scanning unit 21 coupled to an external computer 22 which performs imaging analysis of the images generated by scanning unit 21. In other words, whereas system 10 (FIG. 1) integrates a processor internally inside scanning unit 12, system 20 (FIG. 2) makes use of a processor external to scanning unit 21, e.g., in external computer 22. For example, external computer 22 may include a microprocessor that executes software for image analysis of biological growth plate 24. External computer 22 may comprise a personal computer (PC), desktop computer, laptop computer, handheld computer, workstation, or the like. For example, software programs can be loaded on external computer 22 to facilitate image analysis of images of biological growth plate 24 generated by biological scanning system 20.

Scanning unit 21 is coupled to external computer 22 via interface 25. Interface 25, for example, may comprise a Universal Serial Bus (USB) interface, a Universal Serial Bus 2 (USB2) interface, an IEEE 1394 FireWire interface, a Small Computer System Interface (SCSI) interface, an Advance Technology Attachment (ATA) interface, a serial ATA interface, a Peripheral Component Interconnect (PCI) interface, a conventional serial or parallel interface, or the like.

As illustrated, biological scanning system 20 is designed to receive a biological growth plate 24. In particular, scanning unit 21 includes a housing 26 that defines an input slot 28 for receiving biological growth plate 24. A guide mechanism 23 may be formed on housing 26 to aid insertion of biological growth plate 24 into scanning unit 21. Scanning unit 21 also includes an ejection slot (not shown), through which growth plate 24 is ejected following imaging of growth plate 24. Scanning unit 21 may also include other features, such as a display screen (not shown) to display the progress or results of analysis of the biological growth plate to a user.

Scanning unit 21 houses an imaging device, such as a 2-dimensional monochromatic camera for generating one or more images of an inserted biological growth plate 24. In addition, scanning unit 21 may house various illuminators for illuminating the front and back of biological growth plate 24 during imaging. The illuminators can illuminate biological growth plate 24 with one or more colors, and one or more images of growth plate 24 can be generated and then analyzed to determine bacteria counts on growth plate 24. In particular, scanning unit 21 communicates the images to external computer 22, which includes a processor for performing image analysis.

Growth plate 24 may include a growth area 27 where bacteria or other agents manifest on growth plate 24. Growth area 27 may be a flat surface or a recessed well. A determination of whether a given sample being tested in growth plate 24 is acceptable, in terms of bacterial colony counts, may depend on the number of bacterial colonies per unit area. Accordingly, images generated by scanning unit 21 can be used to quantify the amount of bacterial colonies per unit area on plate 24. The size of individual colonies may also be factored into the analysis, if desired. The surface of biological growth plate 24 in growth area 27 may contain one or more growth enhancing agents designed to facilitate the rapid growth of one or more types of bacteria or other biological agents. In some cases, biological growth plate 24 is incubated prior to insertion into scanning unit 21.

Growth plate 24 may also include indicia 29, such as a bar code or other type of identification marking used to identify growth plate 24. RFID tags, two-dimensional optically detectable codes, or the like, may also be used as indicia. In any case, indicia 29 may identify the type of bacteria or biological agent being grown and tested on growth plate 24. Scanning unit 21 can be designed to draw growth plate 24 into scanning unit 21 to a first location and generate an image of indicia 29, and then draw growth plate 24 to a second location and generate an image of growth area 27. In this manner, images of indicia 29 and growth area 27 can be generated by biological scanning system 20. Alternatively, a single image may capture both indicia 29 and the growth area 27. In either case, the scanning of indicia 29 can facilitate identification of the type of plate being used so that one or more desirable counting rules can be applied in an automated fashion.

By way of example, growth plate 24 may comprise a biological growth plate sold by 3M under the trade name PETRIFILM plates. Growth plate 24 can be utilized to facilitate the rapid growth and detection of bacteria or other biological agents commonly associated with food contamination, including, for example, aerobic bacteria, *E. coli*, coliform, enterobacteriaceae, yeast, mold, *Staphylococcus aureus, Listeria, Campylobacter*, or the like. Growth plates are generally one type of growth medium commonly used for biological growth and bacterial detection and enumeration. The invention, however, may also be applied with a wide variety of other types of growth media.

In order to improve the accuracy of automated counts of biological agents on a biological growth plate, various aspects of the invention establish rules that can be applied during image processing. In other words, the rules described in greater detail below can form part of a counting algorithm executed in system 10 or system 20. The different rules may be used individually or in any combination, depending on the type of growth medium being scanned and the problems that may be encountered. For example, some rules may be relevant for particular types of growth plates as outlined below. The order in which rules are applied may also affect the result. In any event, application of one or more of the counting rules can improve a biological scanning system such as system 10 or system 20 by improving the accuracy of automated counts of biological agents on a growth medium such as a growth plate or the like.

Figure 3:
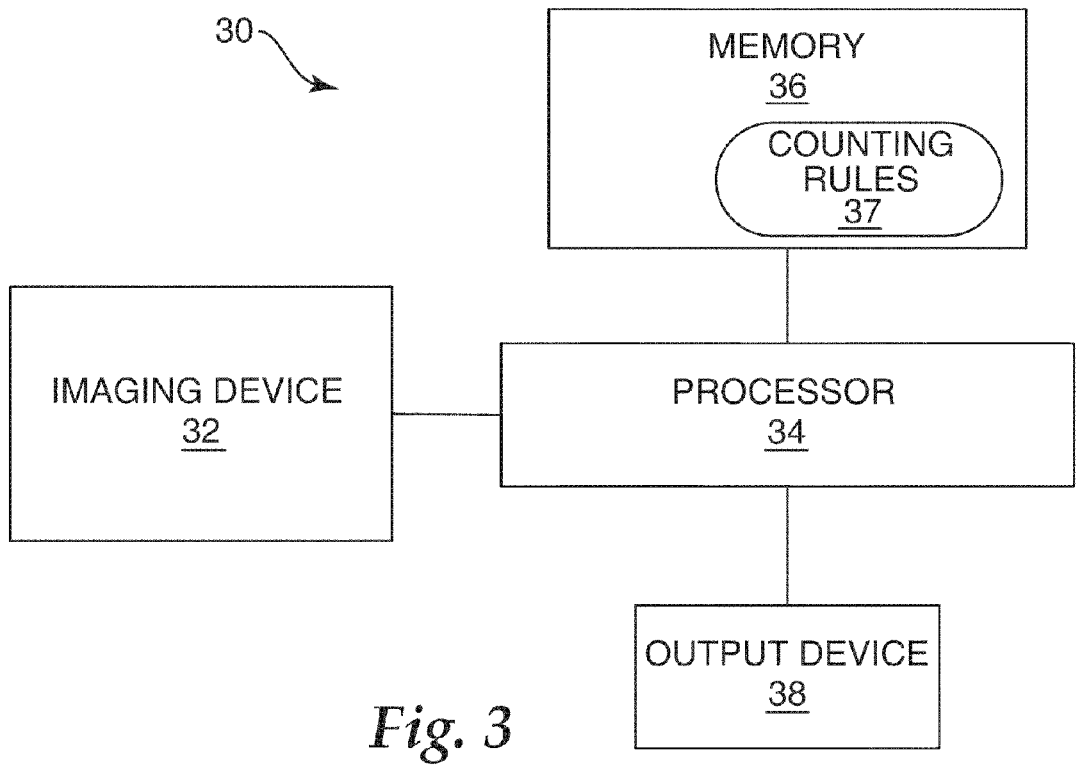
FIG. 3 is a block diagram of a biological scanning system that may correspond to either of the systems illustrated in FIG. 1 or FIG. 2.

FIG. 3 is a block diagram of a biological scanning system 30, which may correspond to system 10 (FIG. 1) or system 20 (FIG. 2). Biological scanning system 30 includes an imaging device 32 that generates one or more images of a growth medium and provides the images to processor 34. Processor 34 is coupled to memory 36. Memory 36 stores various processor-executable software instructions that facilitate image analysis of the images generated by imaging device 32. In particular, memory 36 stores one or more counting rules 37 which are applied during image analysis to improve the accuracy of automated counts of biological agents on a biological growth plate. Output device 38 receives the results determined by processor 34 and provides the results to a user.

By way of example, imaging device 32 may comprise a 2-dimensional monochromatic camera for generating one or more images of a biological growth plate. Various illuminators (not shown) may be used to illuminate the front and back of biological growth plate. For example, the illuminators can illuminate the biological growth plate with one or more colors, and one or more images of the growth plate can be generated by imaging device 32. The images are provided to processor 34 and may also be stored in memory 36. In any case, the images are analyzed by applying counting rules 37 in order to determine bacteria counts on the growth plate. The resolution of imaging device 32 may be approximately 155 pixels per centimeter. In that case, a one centimeter line in the image is 155 pixels long and each pixel is approximately $6.45 \times 10^{-3}$ long.

Reducing the cost of imaging device 32 is desirable. Although high cost optical elements, such as high-quality lenses can improve imaging, such elements can drive up the cost of system 30 to exorbitant levels. One or more of counting rules 37 may provide an alternative mechanism for achieving improvements in system 30. For example, one or more counting rules 37 may compensate for optical defects in imaging device 32. Accordingly, in some cases, counting rules 37 can reduce the costs of system 30 by allowing lower cost optical elements to be used in imaging device 32.

Processor 34 may comprise a general-purpose microprocessor that executes software stored in memory 36. Alternatively, processor 34 may comprise an application specific integrated circuit (ASIC) or other specifically designed processor. In any case, processor 34 executes various counting rules 37 to improve the accuracy of automated counts of biological agents on a biological growth plate.

Memory 36 is one example, of a computer readable medium that stores processor executable software instructions applied by processor 34. By way of example, memory 36 may comprise random access memory (RAM), read-only memory (ROM), non-volatile random access memory (NVRAM), electrically erasable programmable read-only memory (EEPROM), flash memory, or the like. Counting rules 37 such as those described below, are stored in memory 36 and may form part of a larger software program used for image analysis.

Output device 38 typically comprises a display screen used to communicate results to a user. However, output device 38 could also comprise other types of devices such as a printer or the like. Output device 38 may form part of a biological scanning unit, such as display 16 of scanning unit 12 (FIG. 1), or may be external to the scanning unit, such as the display screen of external computer 22 (FIG. 2).

Figure 4:
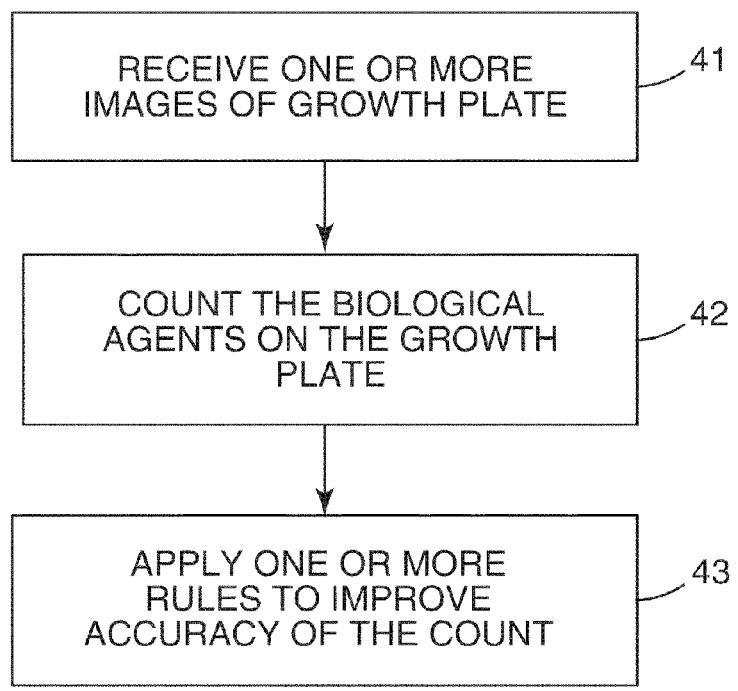
FIG. 4 is a flow diagram illustrating a process of automated biological growth plate analysis.

FIG. 4 is a flow diagram illustrating a process of automated biological growth plate analysis. As shown in FIG. 4, processor 34 receives one or more images of a growth plate (41). Processor 34 invokes various software routines from memory 36 to count the biological agents on the growth plate (42). For example, bacterial colonies may be identified according to color differences, in which bacterial colonies manifest on the growth medium by changing color. The software executed by processor 34 can allow for identification of the biological growth area on the growth plate and automated counting of bacterial colonies based on color changes in the growth area where the colonies have grown during incubation.

In accordance with the invention, processor 34 applies one or more rules to improve the accuracy of the count of biological agents on the growth medium (43). A variety of rules are described in the following description. The rules may be applied individually or various combinations of rules may be used, depending on the type of growth plate being analyzed. The rules may be individually invoked from memory 36 or may form sub-routines of a larger image analysis software program. The rules described below are labeled as rules 1, 2A, 2B, 3A, 3B, 4, 5 and 6. This notation, however, is provided to aid the discussion of the rules, and in no way implies an order of the application of the rules. The rules may be applied individually or various sets of the rules may be applied. If a set of rules are used, then the order in which the rules are applied may be selected based on the type of plate being scanned. The selected order for application of the rules may affect the end result. Various subsets of the rules may also be applied in any order, and the selected order for a subset of rules may also affect the end result.

Figure 5:
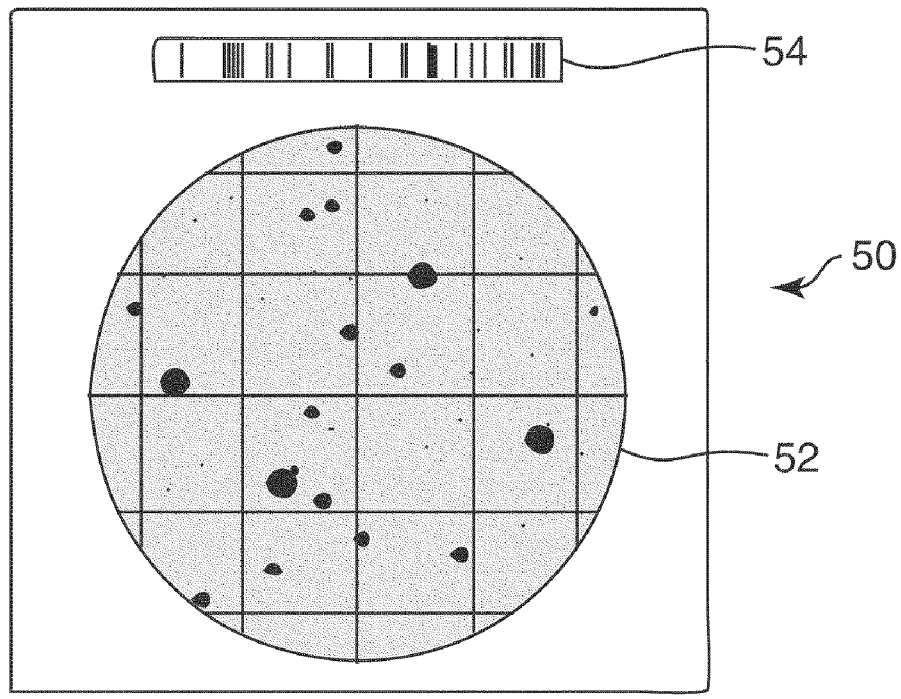
FIGS. 5 and 6 are diagrams of exemplary growth media collectively illustrating one problem that can occur.
Figure 6:
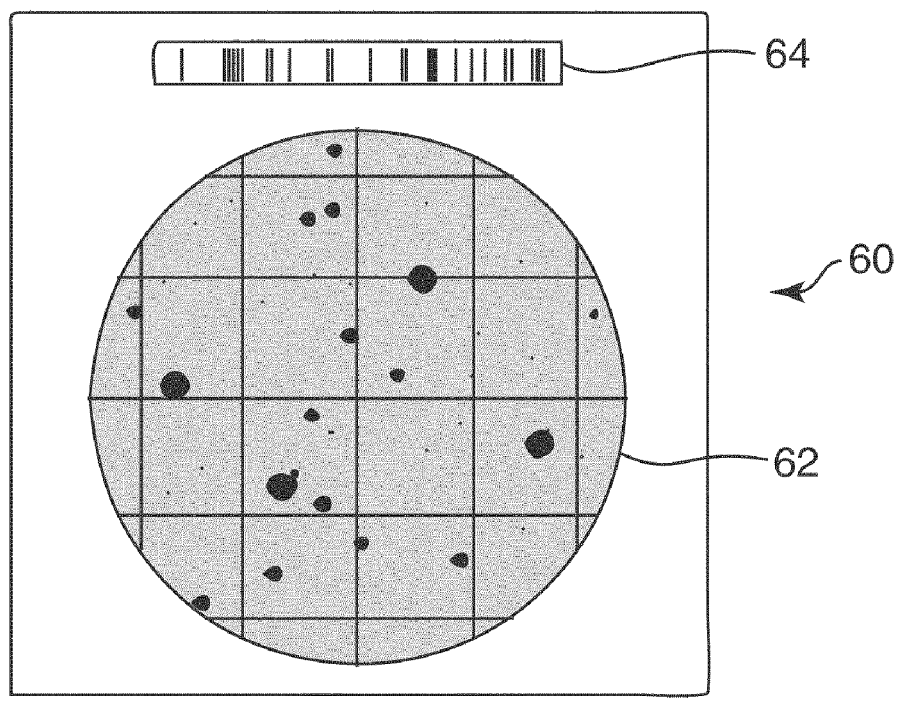

FIG. 5 illustrates an exemplary growth plate 50 including a growth area 52 and indicia 54, e.g., for identifying plate 50 as a specific type of growth plate, sample dilution, sample type or origin. Similarly, FIG. 6 illustrates an exemplary growth plate 60 including a growth area 62 and indicia 64. As illustrated, the background color or shading associated with growth area 52 of growth plate 50 is different than that of growth area 62 of growth plate 60. If the background color associated with growth area 52 of growth plate 50 does not fall within a defined color range, then problems may exist with respect to growth plate 50. In accordance with rule 1 described herein, the color of a growth plate can be identified and compared to a color range. If the color of the growth plate falls outside the range, the growth plate can be flagged for review by a technician.

Figure 7:
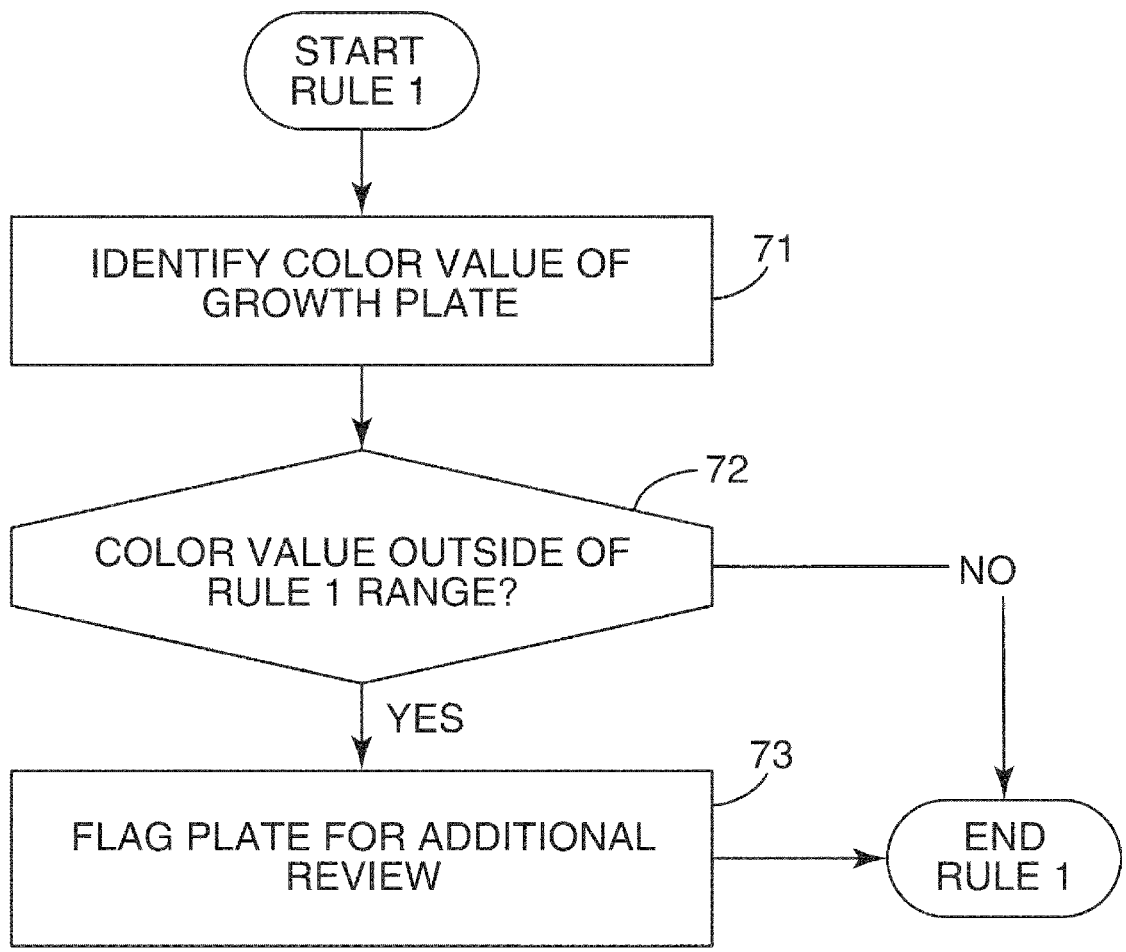
FIG. 7 is a flow diagram illustrating a rule 1 that may be used during a process of automated biological growth plate analysis to address the problem illustrated in FIGS. 5 and 6.

FIG. 7 is a flow diagram illustrating rule 1. As illustrated, processor 34 invokes software stored in memory 36 to identify the color value of a growth plate (71). In particular, processor 34 may quantify the color of the growth plate as one or more numeral values that defines the shade of the plate. The shade, for example, may be characterized by 3 numbers defining red, green and blue values, or hue, saturation and intensity values. If one or more of the color values of the growth plate are outside a rule 1 range (72), e.g., if the shade of the plate is not within a range of shades established as acceptable, then that growth plate is flagged for additional review (73). For example, flagged growth plates may require technician review in order to determine if the color of the growth plate indicates a problem. In this manner, rule 1 automates the identification of potentially faulty growth plates based on the color of the plate. The rule 1 color range is generally specific to the type of growth plate used, and generally establishes a range of colors that indicate that the growth plate is acceptable. Shade values can be used to define the color range and color values with one or more numerical values.

Figure 8:
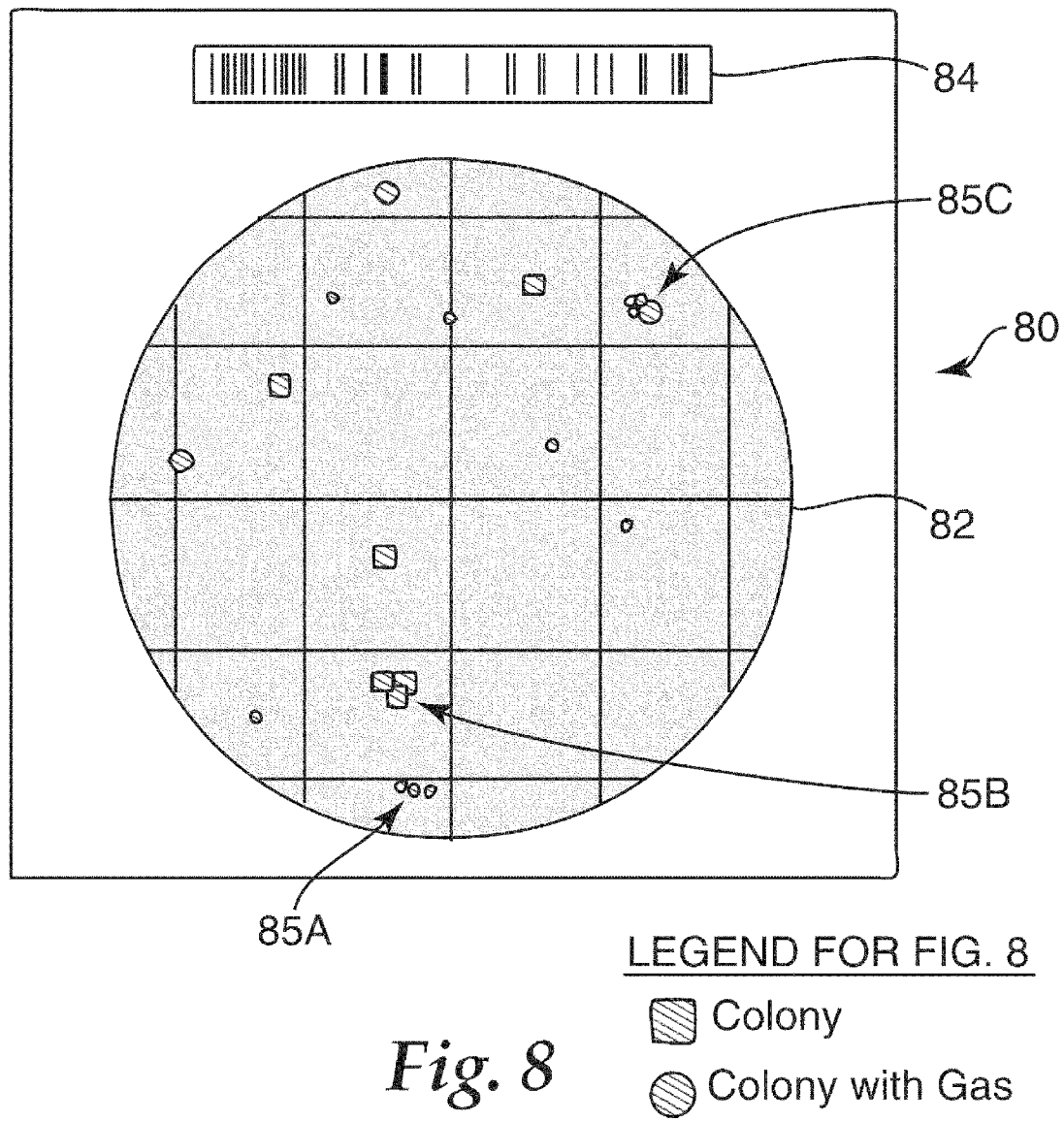
FIG. 8 is a diagram of an exemplary growth medium illustrating one problem that can occur.

FIG. 8 illustrates an exemplary growth plate 80 including a growth area 82 and indicia 84. FIG. 8 also provides a legend which indicates that square-shaped areas are colonies that have been identified and circular-shaped areas are colonies with gas that have been identified. For some growth plates, colonies with gas indicate confirmed types of biological colonies that can be enumerated, whereas colonies without gas indicate a colony that may or may not be enumerated.

One problem with growth plates is that one colony may split and generally manifest as two or more distinct marks on the growth plate. In that case, the two or more distinct marks generally indicate the same colony for purposes of bacterial counts. However, automated systems may count each marking as a separate colony. This problem often becomes more prevalent with colonies that include gas because the gas may generate from within, above or below the perimeter of the colony, which can affect the colony and cause it to split.

In order to reduce this problem, rules 2A and 2B provide alternative techniques for identifying colonies that have likely split from a single colony that grew on the growth plate. In general, when a growth plate includes a limited number of colonies and two or more colonies are very close together, it may be desirable to count the two or more colonies that are very close together as a single colony because of a high probability that the two colonies split from a single colony that grew on the growth plate. The sets of colonies identified at 85A, 85B and 85C, for example, may be likely candidates for application of such a rule.

Figure 9:
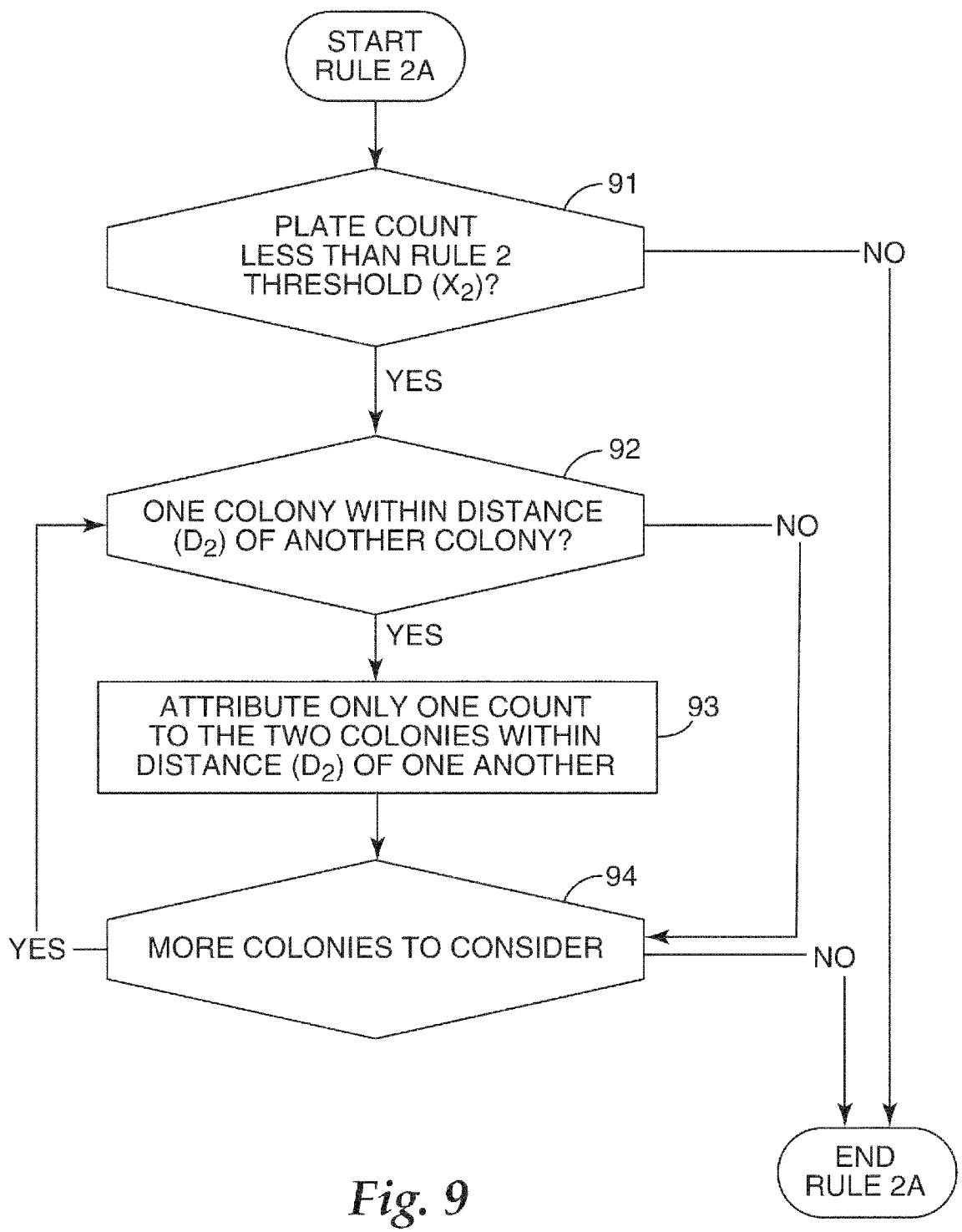
FIG. 9 is a flow diagram illustrating a rule 2A that may be used during a process of automated biological growth plate analysis to address the problem illustrated in FIG. 8.

FIG. 9 is a flow diagram illustrating rule 2A. Processor 34 invokes software stored in memory 36 to analyze one or more images of a biological growth plate count the number of biological agents on the plate. If the plate count, i.e., the initial number of agents identified on the plate is greater than a rule 2 threshold (no branch of 91), then no change is made to the plate count. However, if the plate count is less than the rule 2 threshold (yes branch of 91), then changes may occur. For example, the rule 2 threshold may be approximately 20 although this number could take any value for various implementations. In general, it is most desirable to invoke steps (92-94) when the number of initial counts is relatively small because incorrect counts have a more drastic affect on the percentage of counts when the number of total counts is relatively low.

If the plate count is less than the rule 2 threshold (yes branch of 91), then processor 34 determines whether one colony is within a defined distance $D_2$ of another colony (92). If so (yes branch of 92), processor attributes only one count to the two colonies within the defined distance $D_2$ of each other (73). The distance $D_2$ may be defined in terms of absolute distance or in terms of pixels in the images. For example, the distance $D_2$ may be defined as a width of approximately 18 pixels from center to center of two pixels. If two colonies are within distance $D_2$ of each other (93), e.g., from center to center, those two colonies are counted as one colony.

In other words, if two colonies are very close to one another on a growth plate that has relatively few colonies, then those two colonies are counted as a single colony because of a high probability that the two colonies split from a single colony that grew on the growth plate. Processor 34 considers every colony on the growth plate and determines for each colony whether it has neighboring colonies within the distance $D_2$ of the given colony. The process of rule 2A ends when there are no more colonies to consider (no branch of 94). Accordingly, if three or more colonies are within a distance $D_2$ of one another, the three or more colonies will be counted as one colony.

Figure 10:
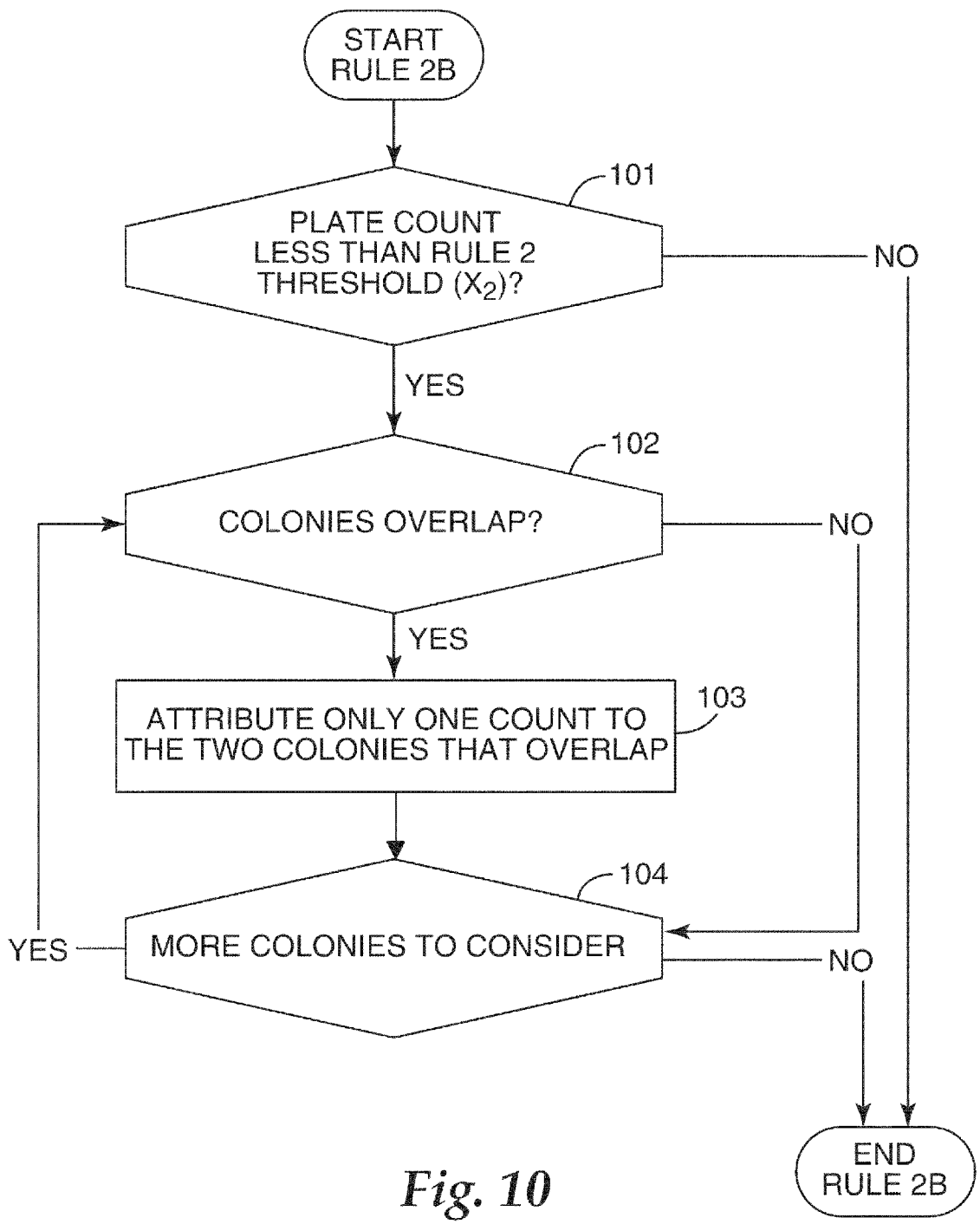
FIG. 10 is a flow diagram illustrating a rule 2B that may be used during a process of automated biological growth plate analysis to address the problem illustrated in FIG. 8.

FIG. 10 is a flow diagram illustrating rule 2B, which is a slight variation to rule 2A. Rules 2A and 2B are generally alternatives of solving a similar problem, e.g., identifying when two or more colonies in an initial count should be counted as a single colony. In both cases, processor 34 generates a first count, and then reduces the first count to generate a second count upon identifying two or more colonies in the first count that should be counted as a single colony. The same rule 2 threshold $X_2$ is used in FIGS. 9 and 10, although different thresholds could also be used for the different rules.

Again, processor 34 invokes software stored in memory 36 to analyze one or more images of a biological growth plate count the number of biological agents on the plate. If the plate count, i.e., the initial number of agents identified on the plate is greater than a rule 2 threshold (no branch of 101), then no change is made to the plate count. However, if the plate count is less than the rule 2 threshold (yes branch of 101), then changes may occur.

In particular, if the plate count is less than the rule 2 threshold (yes branch of 101), then processor 34 determines whether two colonies overlap (102). For example, processor 34 may define an identification mark that surrounds an area associated with each colony, which is typically between approximately 0.2 and 0.3 centimeters in diameter, although the colony mark may be proportional to the size of the colony exhibited. If two identification marks of two different areas overlap (yes branch of 102), processor 34 attributes only one count to the two colonies that overlap (103). In other words, if two colonies are very close to one another on a growth plate that has relatively few colonies, then those two colonies are counted as a single colony because of a high probability that the two colonies split from a single colony that grew on the growth plate. Processor 34 considers every colony on the growth plate and determines for each colony whether it has neighboring colonies that overlap with the given colony. The process of rule 2B ends when there are no more colonies to consider (no branch of 104).

FIG. 11 illustrates an exemplary growth plate 110 including a growth area 112 and indicia 114. FIG. 11 also provides a legend which indicates that circular-shaped areas are colonies, and relatively large irregular shapes are spreader colonies (also referred to as "liquefier colonies"). One problem with growth plates like that illustrated in FIG. 11 is that one or more colonies may manifest from a spreader colony. In that case, the colonies that are relatively close to a spreader colony may actually be part of the spreader colony and not a separate and distinct colony. However, automated systems may count each marking as a separate colony, including the spreader colony and various colonies that manifest from the spreader colony.

In order to reduce this problem, rules 3A and 3B provide alternative techniques for identifying colonies that have likely split from a spreader colony. Rules 3A and 3B are very similar to rules 2A and 2B identified above, but are specific to cases where spreader colonies have been identified. In general, when a growth plate includes a limited number of colonies and one or more colonies are very close to a relatively large spreader colony, it may be desirable to include the two or more colonies that are very close to the spreader colony as part of the spreader colony. The spreader colonies identified at 115A and 115B, for example, may be likely candidates for application of such a rule. The same rule 3 threshold $X_3$ is used in FIGS. 12 and 13, although different thresholds could also be used for the different rules.

Figure 12:
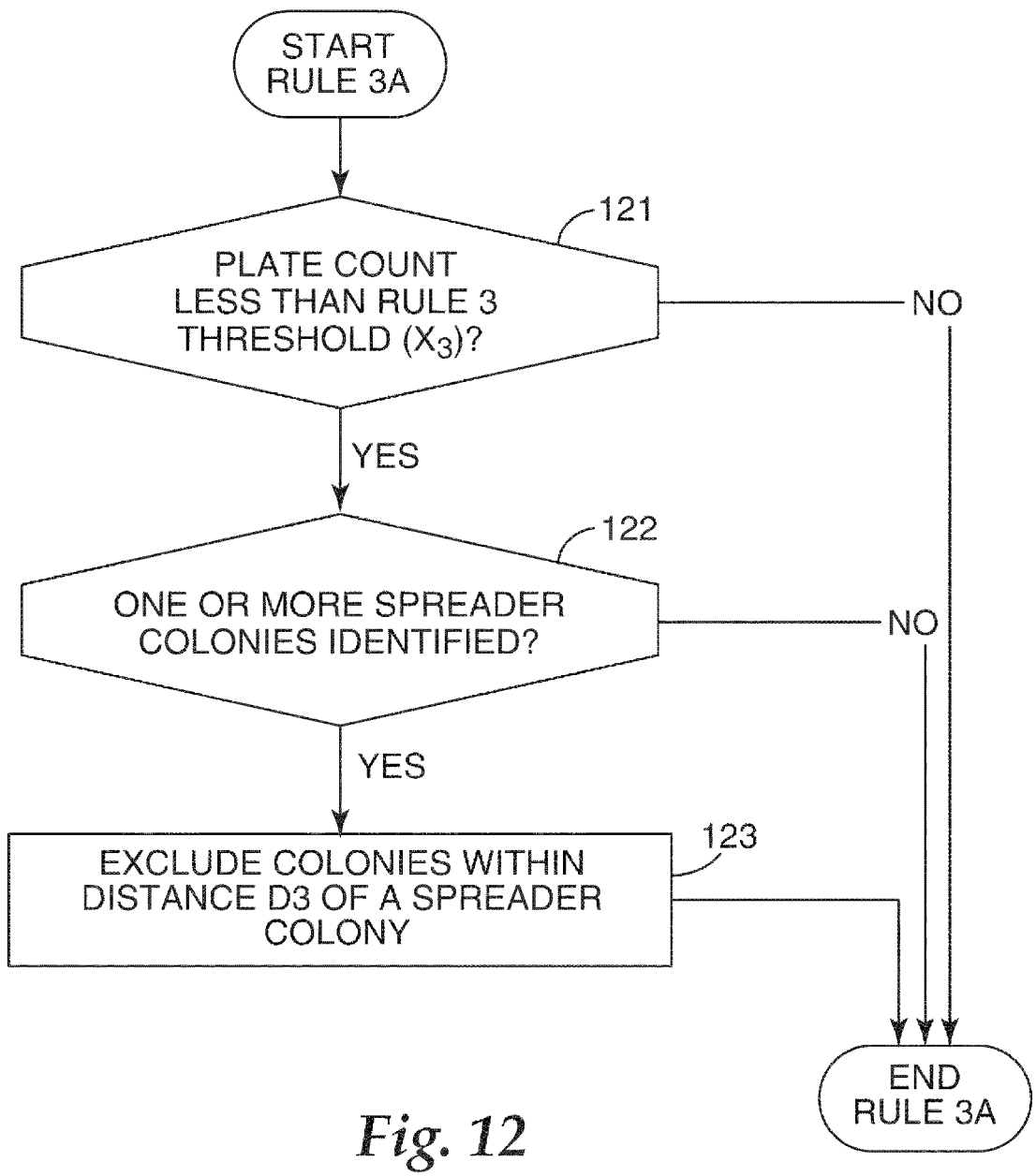
FIG. 12 is a flow diagram illustrating a rule 3A that may be used during a process of automated biological growth plate analysis to address the problem illustrated in FIG. 11.

FIG. 12 is a flow diagram illustrating rule 3A. Processor 34 invokes software stored in memory 36 to analyze one or more images of a biological growth plate count the number of biological agents on the plate. If the plate count, i.e., the initial number of agents identified on the plate is greater than a rule 3 threshold (no branch of 121), then no change is made to the plate count. However, if the plate count is less than the rule 3 threshold (yes branch of 121), then changes may occur. For example, the rule 3 threshold may be approximately 150 although this number could take any value for various implementations. In general, it is most desirable to invoke steps (122-123) when the number of initial counts is below a threshold because incorrect counts have a more drastic affect on the percentage of counts when the number of total counts is relatively low.

If the plate count is less than the rule 3 threshold (yes branch of 121), then processor 34 determines whether a spreader colony was identified (122). For example, spreader colonies may be identified based on shape, size and/or color. In particular spreader colonies generally have a relatively large irregular shape and may manifest at a slightly different color than other colonies. If one or more spreader colonies are identified, then processor 34 excludes from the count, any colonies within a defined distance ($D_3$) of the spreader colony. The distance $D_3$ may be defined in terms of absolute distance or in terms of pixels in the images. For example, the distance $D_3$ may be approximately 0.065 cm, which may correspond to the width of approximately 10 pixels in system 30. In any case, any colonies within distance $D_3$ of a spreader colony are excluded from the count, and attributed to being part of the spreader colony.

Figure 13:
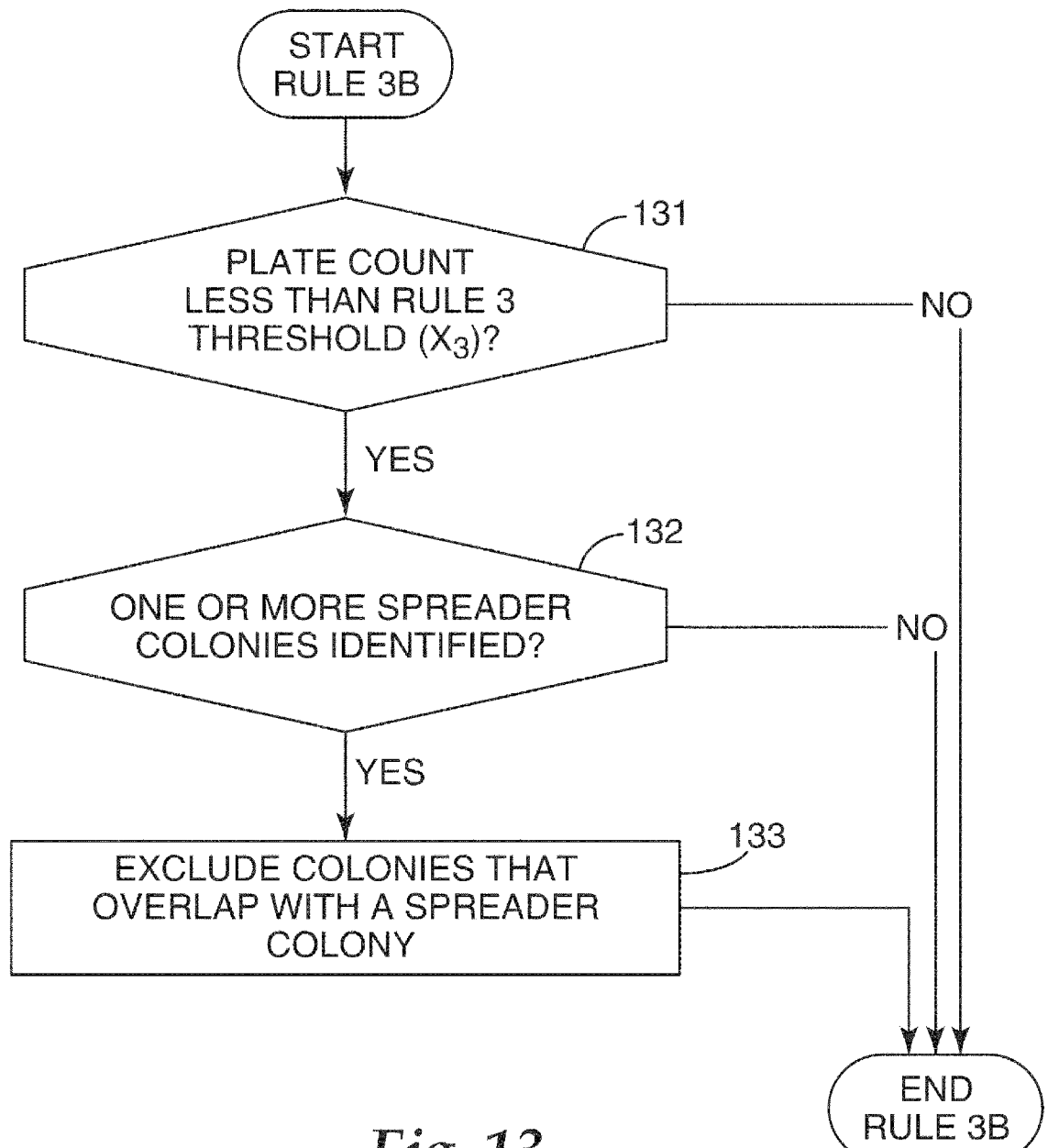
FIG. 13 is a flow diagram illustrating a rule 3B that may be used during a process of automated biological growth plate analysis to address the problem illustrated in FIG. 11.

FIG. 13 is a flow diagram illustrating rule 3B, which is a slight variation to rule 3A. Rules 3A and 3B are generally alternatives of solving a similar problem, e.g., identifying when colonies in an initial count should be counted as part of a spreader colony. In both cases, processor 34 generates a first count, and then reduces the first count to generate a second count upon identifying a spreader colony and another colony that should be counted as part of the spreader colony.

Processor 34 invokes software stored in memory 36 to analyze one or more images of a biological growth plate count the number of biological agents on the plate. If the plate count, i.e., the initial number of agents identified on the plate is greater than a rule 3 threshold (no branch of 131), then no change is made to the plate count. However, if the plate count is less than the rule 3 threshold (yes branch of 131), then changes may occur.

In particular, if the plate count is less than the rule 3 threshold (yes branch of 131), then processor 34 determines whether a spreader colony was identified (132). Again, spreader colonies may be identified based on shape, size and/or color. If one or more spreader colonies are identified, then processor 34 excludes from the count, any colonies that overlap with spreader colony (133). For example, processor 34 may define a relatively large identification mark that surrounds an area associated with the spreader colony. In addition, processor 34 may define identification marks that surround areas associated with other colonies. If the identification mark associated with the spreader colony overlaps that of any other colonies, the other colonies that overlap the spreader colony are excluded from the count. In that case, the other colonies that overlap the spreader colony are attributed to being part of the spreader colony.

Figure 14:
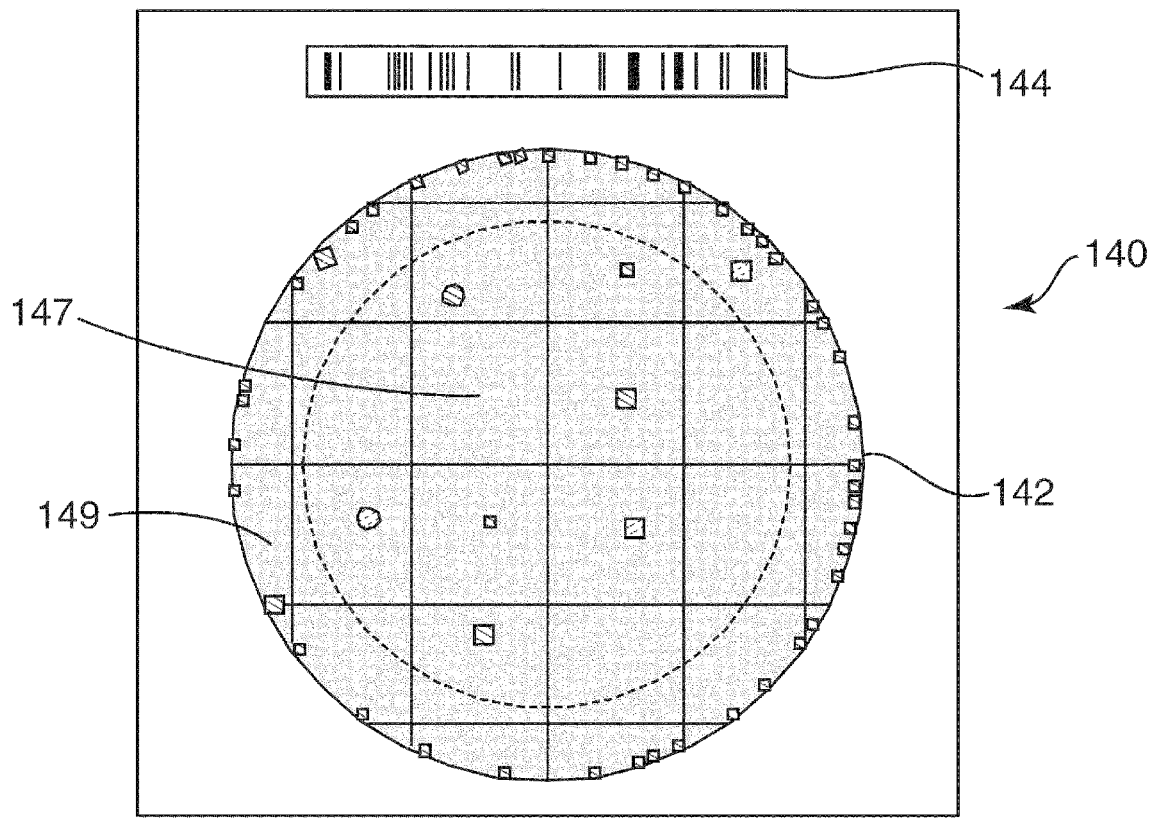
FIG. 14 is a diagram of an exemplary growth medium illustrating one problem that can occur.

FIG. 14 illustrates an exemplary growth plate 140 including a growth area 142 and indicia 144. FIG. 14 also provides a legend which indicates that square-shaped areas are colonies that have been identified and circular-shaped areas are colonies with gas that have been identified. Different shading distinguishes "red" colonies from "blue colonies." Of course, the colors red and blue are exemplary, and similar growth plates may use any other colors. In general, a first color may correspond to one type of colony and the second color may correspond to another type of colony. In some cases, one color may identify a general colony and another may identify a more specific colony. For example, red may identify a coliform colony and blue may identify an E. coli colony, which is a specific type of coliform. Colonies with gas may indicate confirmed types of biological colonies that can be enumerated, whereas colonies without gas may indicate a colony that may or may not be enumerated with certainty, e.g., in accordance with governmental regulations.

One problem with growth plate analysis is that imaging artifacts can cause irregularities in images of growth plates. If relatively low cost optical elements, such as low cost lenses, are used in the imaging device, this problem can be significant. On the other hand, however, it is desirable to control the costs in a biological scanning system and high cost optical elements can add considerable costs. Accordingly, a better option to using higher cost optical elements may be the development of image analysis rules and techniques that can identify and overcome problems associated with lower cost optical elements.

Growth plate 140 includes a relatively few number of colonies in a center portion 147 of growth area 142. However, a larger number of colonies are present in a perimeter portion 149 of growth area 142. Statistically, it is expected that the colonies will be evenly distributed. Accordingly, when a much larger number of colonies are present in a perimeter portion 149 of growth area 142 than interior portion, a problem may be identified. This phenomenon may be attributed to optical defects in imaging device 32. In the following description, the interior portion 147 generally refers to approximately the interior most 75 percent of growth area 142, whereas perimeter portion 149 refers to approximately the perimeter most 25 percent of the growth area 142. In other embodiments, however, the perimeter portion and interior portion may be allocated differently.

Figure 15:
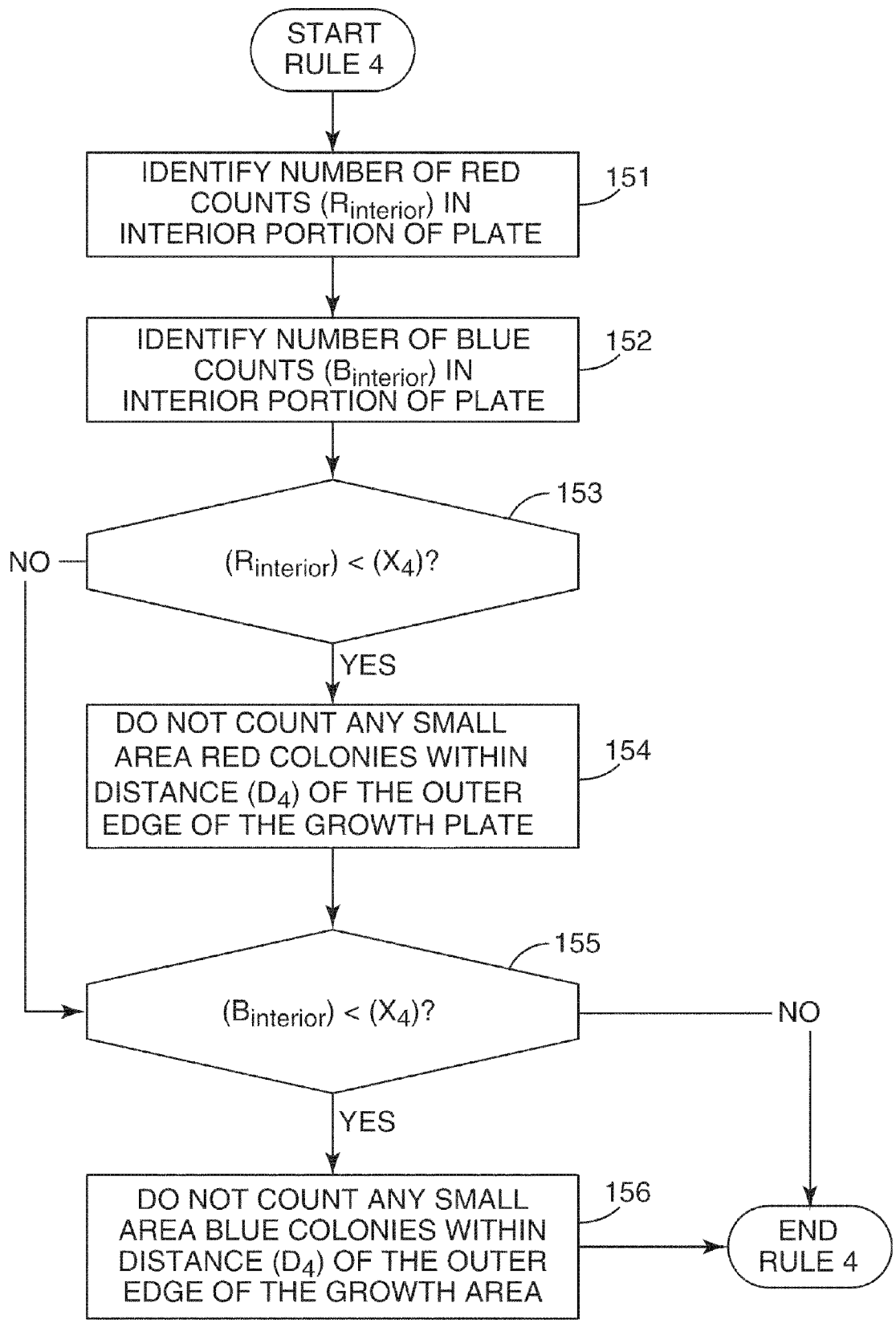
FIG. 15 is a flow diagram illustrating a rule 4 that may be used during a process of automated biological growth plate analysis to address the problem illustrated in FIG. 14.

FIG. 15 is a flow diagram illustrating rule 4, which addresses the problem illustrated in FIG. 14. Although FIG. 15 is described with reference to the colors "red" and "blue," the rule may be applied more generally to any first and second colors.

Processor 34 invokes software stored in memory 36 to analyze one or more images of a biological growth plate count the number of biological agents on the plate. Processor 34 identifies a number of red counts ($R_{interior}$) in the interior portion of a biological growth plate, e.g. interior portion 147 (151). In addition, processor 34 identifies a number of blue counts ($B_{interior}$) in the interior portion of a biological growth plate (152). If the number red counts ($R_{interior}$) in the interior portion of a biological growth plate is less than a rule 4 threshold ($X_4$) (yes branch of 153), then processor does not count any small area red colonies within a defined distance $D_4$ of the outer edge of the growth plate, e.g., perimeter portion 149 (154). Similarly, if the number blue counts ($B_{interior}$) in the interior portion of a biological growth plate is less that a rule 4 threshold ($X_4$) (yes branch of 155), then processor does not count any small area blue colonies within a defined distance $D_4$ of the outer edge of the growth plate, e.g., perimeter portion 149 (154).

Small area colonies generally refer to colonies having a defined area or diameter less than a defined threshold. The small area colonies may be defined relative to an absolute measured size or may be defined in terms of pixels in the images. In one example, small area colonies are colonies having a size smaller than approximately 20 pixels. The distance $D_4$ may be defined in terms of absolute distance or in terms of pixels in the images. For example, the distance $D_4$ may be defined as the width of approximately 5 pixels.

Figure 16:
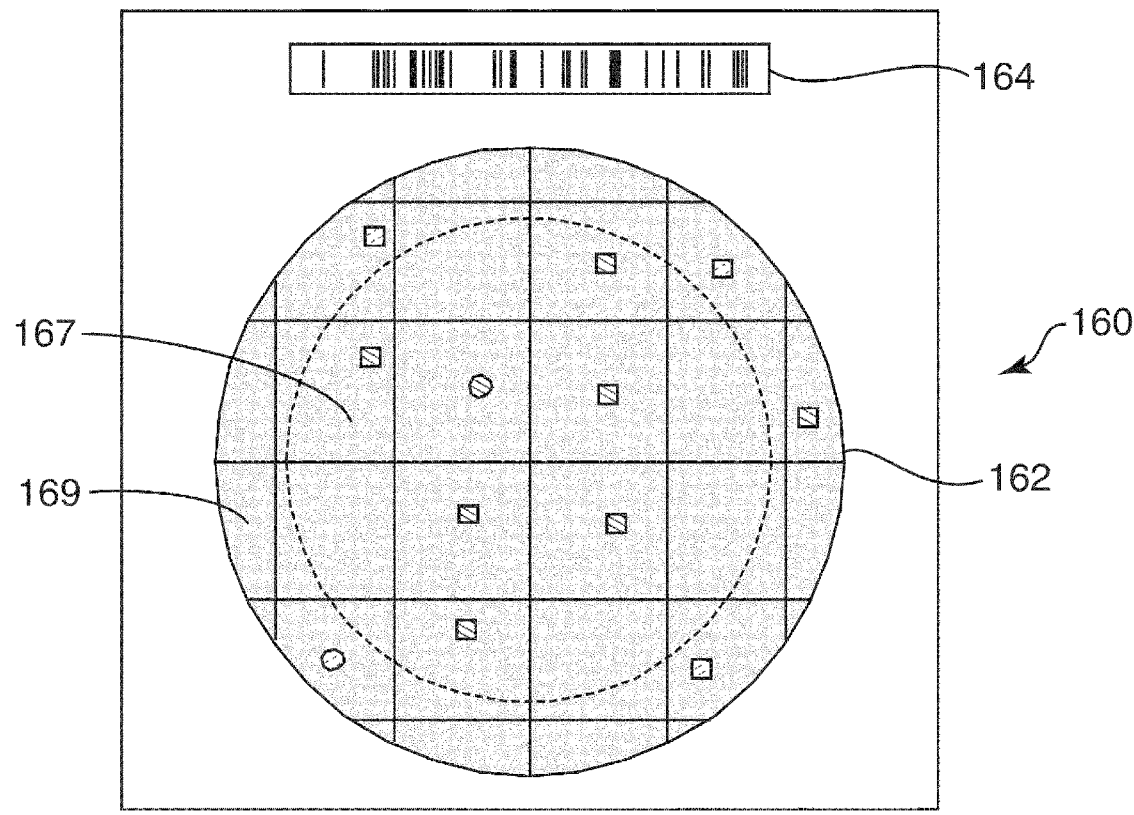
FIG. 16 is a diagram of an exemplary growth medium illustrating one problem that can occur.

FIG. 16 illustrates an exemplary growth plate 160 including a growth area 162 and indicia 164. FIG. 16 also provides a legend which indicates that square-shaped areas are colonies that have been identified and circular-shaped areas are colonies with gas that have been identified. Different shading distinguishes "red" colonies from "blue colonies." Again, however, the colors red and blue are exemplary, and similar growth plates may use any other colors. In general, a first color may correspond to one type of colony and the second color may correspond to another type of colony. In some cases, one color may identify a general colony and another may identify a more specific colony. For example, red may identify a coliform colony and blue may identify an E. coli colony, which is a specific type of coliform. Colonies with gas may indicate confirmed types of biological colonies that can be enumerated, whereas colonies without gas may indicate a colony that may or may not be enumerated with certainty, e.g., in accordance with governmental regulations.

One problem with growth plate analysis is that the growth plate may exhibit an uneven triggering (chemical reaction) of growth indicators. Statistically, it is expected that the colonies will be evenly distributed. If a much higher percentage of red colonies manifest in one area and a much higher percentage of blue colonies manifest in another area, a problem may be identified. In that case, the blue colonies may be counted as red colonies, e.g., where the red colonies identify a more general presence of bacterial growth and the blue colonies identify a more specific type of bacterial growth. With uneven distribution, the presence of blue colonies are less reliable as indicators of the specific type of bacterial growth, but would typically still indicate more general bacterial presence. Accordingly, in automated bacterial colony counting it may be desirable to count the blue colonies as red colonies if uneven distribution is identified, particularly in plates having relatively low bacterial counts.

In growth plate 160 (FIG. 16) for example, six red colonies are present in interior portion 167 and one red colony with gas is present in interior portion 167. No blue colonies or blue colonies with gas are present in interior portion 167. In contrast, perimeter portion 169 includes three blue colonies, one blue colony with gas, and one red colony. In that case, the blue colonies and blue colonies with gas may be counted as red colonies (where the blue with gas are optimally counted as red with gas) because of the uneven distribution. The interior portion 167 may refer to approximately the interior most 75 percent of growth area 162, whereas the perimeter portion 169 may refer to approximately the perimeter most 25 percent of the growth area 162. In other embodiments, however, the perimeter portion and interior portion may be allocated differently.

Figure 17:
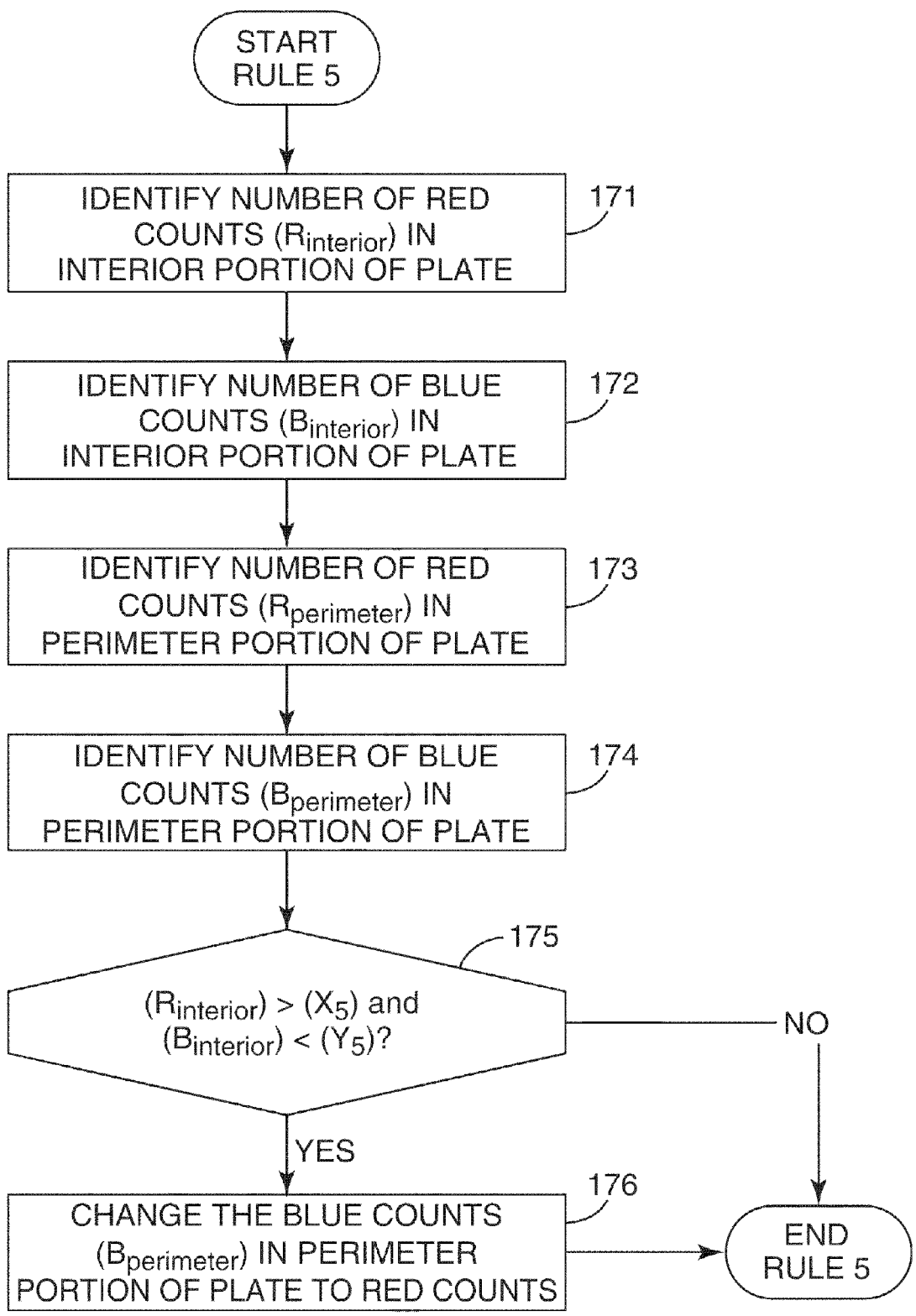
FIG. 17 is a flow diagram illustrating a rule 5 that may be used during a process of automated biological growth plate analysis to address the problem illustrated in FIG. 16.

FIG. 17 is a flow diagram illustrating rule 5, which addresses the problem illustrated in FIG. 16. Although FIG. 17 is described with reference to the colors "red" and "blue," the rule may be applied more generally to any first and second colors.

Processor 34 invokes software stored in memory 36 to analyze one or more images of a biological growth plate count the number of biological agents on the plate. Processor 34 identifies a number of red counts ($R_{interior}$) in the interior portion of a biological growth plate, e.g. interior portion 167 (171). In addition, processor 34 identifies a number of blue counts ($B_{interior}$) in the interior portion of the biological growth plate (172). Also, processor 34 identifies a number of red counts ($R_{perimeter}$) in the perimeter portion of the biological growth plate, e.g. perimeter portion 169 (173), and identifies a number of blue counts ($B_{perimeter}$) in the perimeter portion of the biological growth plate (174).

If the number of red counts ($R_{interior}$) in the interior portion is greater than a first rule 5 threshold ($X_5$) and the number of blue counts ($B_{interior}$) in the interior portion is less than a second rule 5 threshold ($Y_5$) (yes branch of 175), then processor 34 changes the blue counts ($B_{perimeter}$) in the perimeter portion of the plate to red counts (176). In other words, blue colonies in the perimeter portion are counted as red colonies when uneven distribution is identified to an extent that defies probable statistics. By way of example, the first rule 5 threshold ($X_5$) may be approximately five and the second rule 5 threshold ($Y_5$) may be approximately two, although these numbers may be selected differently according to the desired implementation.

FIG. 18 illustrates an exemplary growth plate 180 including a growth area 182 and indicia 184. FIG. 18 also provides a legend which indicates that square-shaped areas are colonies.

Again, one problem with growth plate analysis is that the growth plate may exhibit an uneven triggering (chemical reaction) of growth indicators. Statistically, it is expected that the colonies will be evenly distributed. If a much higher percentage of colonies manifest in one area than another area, a problem may be identified. In that case, it may be desirable to flag the growth plate for additional review, e.g., by a technician.

In growth plate 180 (FIG. 18) for example, four colonies are present in interior portion 187. In contrast, perimeter portion 189 includes fifteen colonies. In that case, it may be desirable to flag the growth plate for additional review, e.g., by a technician because the distribution of colonies defies probable statistics.

Figure 19:
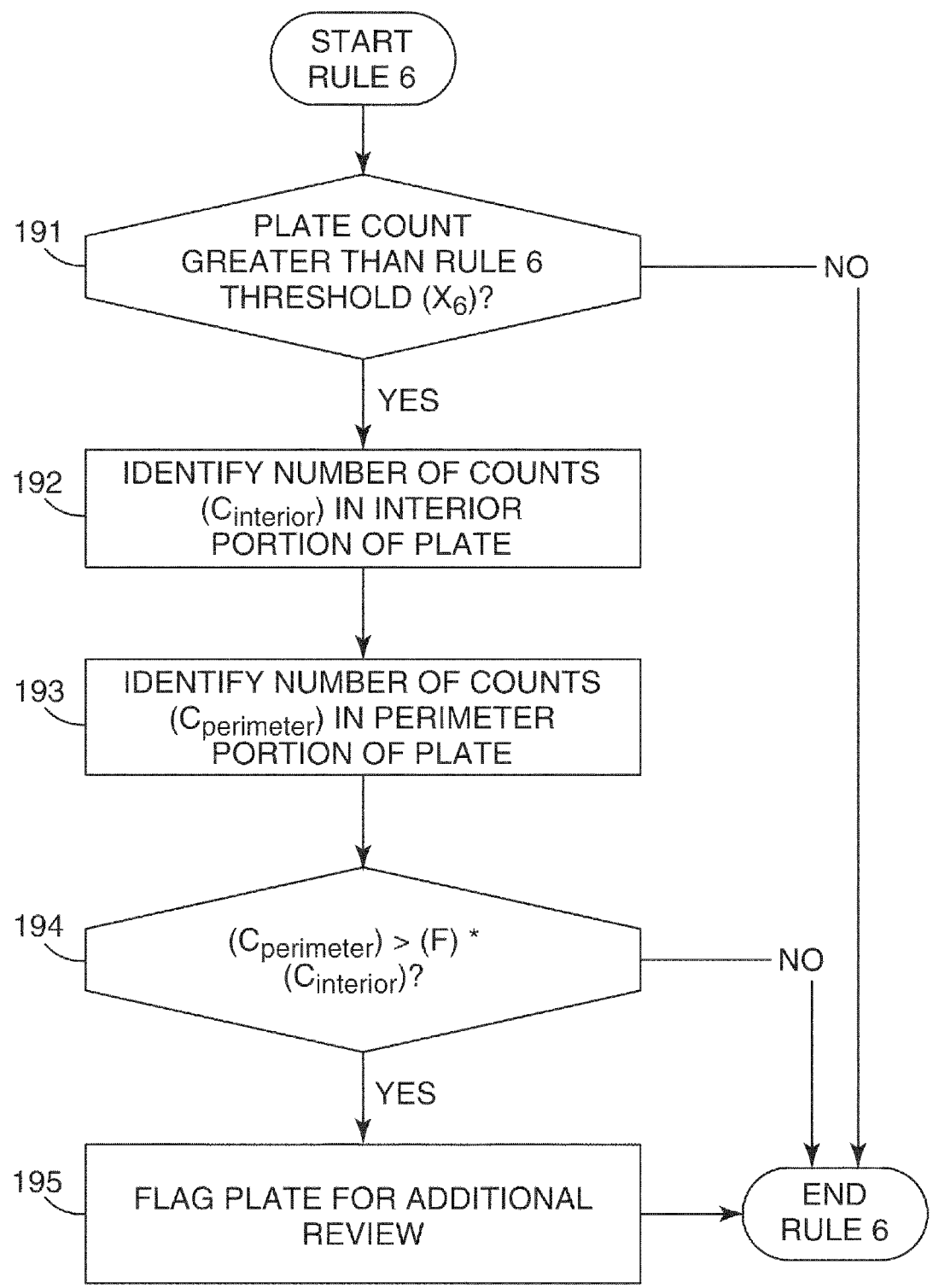
FIG. 19 is a flow diagram illustrating a rule 6 that may be used during a process of automated biological growth plate analysis to address the problem illustrated in FIG. 18.

FIG. 19 is a flow diagram illustrating rule 6, which addresses the problem illustrated in FIG. 18. Processor 34 invokes software stored in memory 36 to analyze one or more images of a biological growth plate count the number of biological agents on the plate. Processor 34 makes an initial count over the growth area and determines whether the plate count is greater than a rule 6 threshold ($X_6$) (191). By way of example, the rule 6 threshold ($X_6$) may be approximately five, although other values could be used in other implementations.

If the plate count is greater than a rule 6 threshold ($X_6$) (yes branch of 191), processor 34 identifies a number of counts ($C_{interior}$) in the interior portion of the biological growth plate, e.g., interior portion 187 (192). Also, processor 34 identifies a number of counts ($C_{perimeter}$) in the perimeter portion of the biological growth plate, e.g., perimeter portion 189 (193). If the number of counts ($C_{perimeter}$) in the perimeter portion is greater than the number of counts ($C_{interior}$) in the interior portion multiplied by a factor (F) (yes branch of 194), then the growth plate is flagged for additional review (195). Once flagged, for example, a technician may be alerted that a manual review should be performed on the flagged growth plate.

The size of the interior portion and the perimeter portion may vary in different implantations. Moreover, the factor (F) that is used may depend on the defined sizes of the interior portion and perimeter portion. In one example, the perimeter portion comprises approximately the outermost 25 percent of the growth area of the growth plate and the interior portion comprises approximately the innermost 75 percent of the growth area of the growth plate. In that case, the factor (F) may be approximately 1.5, although other factors may also be used. The factor (F) is typically a value greater than 1, indicating a disproportionate number of counts in the perimeter portion.

The various rules described herein may be applied individually, or in any combination depending on the growth medium being scanned. By way of example, a variety of PETRIFILM plates are currently sold by 3M. These include aerobic count (AC) plates, coliform count (CC) count plates and E. coli count (EC) plates. Different sets of rules may be applied for analyzing AC, CC and EC plates. Moreover, by identifying the type of plate in indicia on the given plates, the application of the correct rules may be automated in the biological scanning system.

For AC plates, improved counting results may be obtained by application of rule 1, followed by application of rule 3A or rule 3B, followed by application of rule 6. For CC plates, improved counting results may be obtained by application of rule 1, followed by application of rule 2A or 2B, followed by application of rule 4. For EC plates, improved counting results may be obtained by application of rule 1, followed by application of rule 2A or 2B, followed by application of rule 4, followed by application of rule 5. These examples, however, are exemplary, and application of various other sets of rules, possibly in different orders, may be useful in other embodiments.

A number of embodiments of a biological scanning system have been described. In particular, a variety of counting rules have been described that can be used in a biological scanning system to improve the accuracy of automated counts of biological agents on a biological growth plate.

Many of the techniques have been described as being software-implemented. In that case, a computer readable medium stores processor executable instructions that embody one or more of the rules described above. For example, the computer readable medium may comprise random access memory (RAM), read-only memory (ROM), non-volatile random access memory (NVRAM), electrically erasable programmable read-only memory (EEPROM), flash memory, or the like. The computer readable medium may also comprise a non-volatile memory such as a CD-ROM used to deliver the software to customers. Also, the computer readable medium may comprise an electromagnetic carrier wave, e.g., for delivering the software over a network such as the internet.

The same techniques, however, may also be implemented in hardware. Example hardware implementations include implementations within an application specific integrated circuit (ASIC), a field programmable gate array (FPGA), specifically designed hardware components, or any combination thereof. In addition, one or more of the techniques described herein may be partially executed in hardware, software or firmware.

In any case, various modifications may be made without departing from the spirit and scope of the invention. For example, one or more of the rules described herein may be used with or without other rules and various subsets of the rules may be applied in any order, depending on the desired implementation. These and other embodiments are within the scope of the following claims.

The invention claimed is:

1. A method comprising:
receiving one or more images of a biological growth medium;
identifying a first count of biological agents on the biological growth medium;
determining whether the first count is below a threshold;
reducing the first count to generate a second count when the first count is below the threshold and one or more biological agents identified in the first count are determined to be in close proximity to one or more other biological agents identified in the first count;
avoiding reduction of the first count to generate the second count when the first count is not below the threshold; and
avoiding reduction of the first count to generate the second count when one or more biological agents in the first count are not determined to be in close proximity to one or more other biological agents identified in the first count.

2. A computer readable medium comprising computer readable instructions that when executed in a processor:
receive one or more images of a biological growth medium;
identify a first count of biological agents on the biological growth medium;
determine whether the first count is below a threshold;
reduce the first count to generate a second count when the first count is below the threshold and one or more biological agents identified in the first count are determined to be in close proximity to one or more other biological agents identified in the first count;
avoid reduction of the first count to generate the second count when the first count is not below the threshold; and
avoid reduction of the first count to generate the second count when one or more biological agents in the first count are not determined to be in close proximity to one or more other biological agents identified in the first count.

3. A system comprising:
an imaging device to generate one or more images of a biological growth medium; and
a processor to receive the images, identify a first count of biological agents on the biological growth medium, determine whether the first count is below a threshold, reduce the first count to generate a second count when the first count is below the threshold and one or more biological agents identified in the first count are determined to be in close proximity to one or more other biological agents identified in the first count, avoid reduction of the first count to generate the second count when the first count is not below the threshold, and avoid reduction of the first count to generate the second count when one or more biological agents in the first count are not determined to be in close proximity to one or more other biological agents identified in the first count.

* * * * *

UNITED STATES PATENT AND TRADEMARK OFFICE
CERTIFICATE OF CORRECTION

| | |
|---|---|
| PATENT NO. | : 7,957,575 B2 |
| APPLICATION NO. | : 12/795921 |
| DATED | : June 7, 2011 |
| INVENTOR(S) | : Plumb et al. |

Page 1 of 1

It is certified that error appears in the above-identified patent and that said Letters Patent is hereby corrected as shown below:

Title Page 2, under Foreign Patent Documents
Line 22, please delete "WO 94/26926 1/1994" and insert in place thereof --WO 94/26926 11/1994--.
Line 35, please delete "WO 02/90966 2/2002" and insert in place thereof --WO 02/90966 1/2002--.

Title Page 2, under Other Publications
Line 20, delete "Colonie" and insert in place thereof --Colonies--.

Column 1,
Line 14, delete "scaning" and insert in place thereof --scanning--.

Column 2,
Line 51, delete "a".

Column 3,
Line 40, delete "a".

Column 4,
Line 30, delete "a".

Column 6,
Line 45, delete "scanning" and insert in place thereof --scanning.--.

Column 8,
Line 60, delete "6.45×10 EE-3" and insert in place thereof --6.45×10EE-3--.

Column 12,
Line 43, delete "particular" and insert in place thereof --particular,--.

Signed and Sealed this
Tenth Day of April, 2012

David J. Kappos
*Director of the United States Patent and Trademark Office*